(12) United States Patent
Prause et al.

(10) Patent No.: US 11,806,949 B2
(45) Date of Patent: Nov. 7, 2023

(54) BLADDER MANDREL PACKAGE

(71) Applicant: The Boeing Company, Chicago, IL (US)

(72) Inventors: Richard A. Prause, Charleston, SC (US); Andrew E. Modin, Charleston, SC (US); Allen J. Halbritter, Charleston, SC (US); Richard E. Heath, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 39 days.

(21) Appl. No.: 17/506,056

(22) Filed: Oct. 20, 2021

(65) Prior Publication Data
US 2022/0040938 A1 Feb. 10, 2022

Related U.S. Application Data

(62) Division of application No. 16/224,969, filed on Dec. 19, 2018, now Pat. No. 11,179,902.

(51) Int. Cl.
*B29C 33/00* (2006.01)
*B29C 70/00* (2006.01)
(Continued)

(52) U.S. Cl.
CPC .......... *B29C 70/446* (2013.01); *B29C 33/505* (2013.01); *B29C 70/682* (2013.01);
(Continued)

(58) Field of Classification Search
CPC ....... B29C 33/00; B29C 33/50; B29C 33/505; B29C 70/00; B29C 70/40; B29C 70/44;
(Continued)

(56) References Cited

U.S. PATENT DOCUMENTS 5,904,972 A 5/1999 Tunis, III et al.
6,071,460 A 6/2000 Renaudin et al.
(Continued)

FOREIGN PATENT DOCUMENTS

CA 103692662 4/2014
CA 104816493 8/2015
(Continued)

OTHER PUBLICATIONS

European Patent Office, "Communication pursuant to Article 94(3) EPC," App. No. 19 209 990.1 (Sep. 6, 2022).
(Continued)

*Primary Examiner* — Jacob T Minskey
*Assistant Examiner* — Matthew Hoover
(74) *Attorney, Agent, or Firm* — Walters & Wasylyna LLC

(57) ABSTRACT

A bladder mandrel package, used to manufacture a composite structure, includes a mandrel and a wrap ply, surrounding the mandrel to form a wrapped mandrel. The bladder mandrel package also includes a first radius filler, coupled to the wrap ply at a first radius of the wrapped mandrel, and a second radius filler coupled to the wrap ply at a second radius of the wrapped mandrel. The mandrel, the wrap ply, the first radius filler, and the second radius filler are consolidated to from the bladder mandrel package.

20 Claims, 25 Drawing Sheets

(51) Int. Cl.
  *B29C 70/44* (2006.01)
  *B64F 5/10* (2017.01)
  *B29C 33/50* (2006.01)
  *B29C 70/68* (2006.01)
  *B29D 99/00* (2010.01)
  *B29L 31/30* (2006.01)
  *B64C 1/06* (2006.01)
  *B64C 3/18* (2006.01)

(52) U.S. Cl.
  CPC ............ *B29D 99/0003* (2013.01); *B64F 5/10* (2017.01); *B29L 2031/3082* (2013.01); *B29L 2031/3085* (2013.01); *B64C 1/064* (2013.01); *B64C 3/182* (2013.01)

(58) Field of Classification Search
  CPC ....... B29C 70/446; B29C 70/60; B29C 70/68; B29C 70/682
  See application file for complete search history.

(56) References Cited

U.S. PATENT DOCUMENTS

| | | | |
|---|---|---|---|
| 8,293,051 B2 | 10/2012 | Morris et al. | |
| 8,800,953 B2 | 8/2014 | Morris et al. | |
| 9,327,467 B2 | 5/2016 | Robins et al. | |
| 2010/0139850 A1* | 6/2010 | Morris | B29C 33/485 156/500 |
| 2010/0139857 A1* | 6/2010 | Pham | B32B 37/1009 425/389 |
| 2010/0304094 A1 | 12/2010 | Brook et al. | |
| 2011/0277918 A1* | 11/2011 | Lee | B29D 99/0003 156/580 |
| 2016/0009045 A1 | 1/2016 | Thomas | |
| 2016/0243730 A1 | 8/2016 | Robins et al. | |
| 2017/0136687 A1 | 5/2017 | Heath et al. | |
| 2018/0111672 A1 | 4/2018 | Wilcoxson et al. | |
| 2018/0319050 A1 | 11/2018 | Prause et al. | |
| 2018/0319051 A1 | 11/2018 | Heath et al. | |

FOREIGN PATENT DOCUMENTS

| | | |
|---|---|---|
| CN | 108791946 | 11/2018 |
| EP | 2 256 031 | 12/2010 |
| EP | 2 676 787 | 12/2013 |
| EP | 2 998 228 | 3/2016 |
| WO | WO 2004/011169 | 2/2004 |

OTHER PUBLICATIONS

China National Intellectual Property Administration, Office Action, with English translation, App. No. 201911041639.3 (dated Jan. 28, 2023).

National Institute of Industrial Property (Brazil), Office Action, with English translation, App. No. BR102019026366-0 (dated Apr. 10, 2023).

China National Intellectual Property Administration, Office Action, with English Translation, App No. 201911041639.3 (dated Jul. 6, 2023).

* cited by examiner

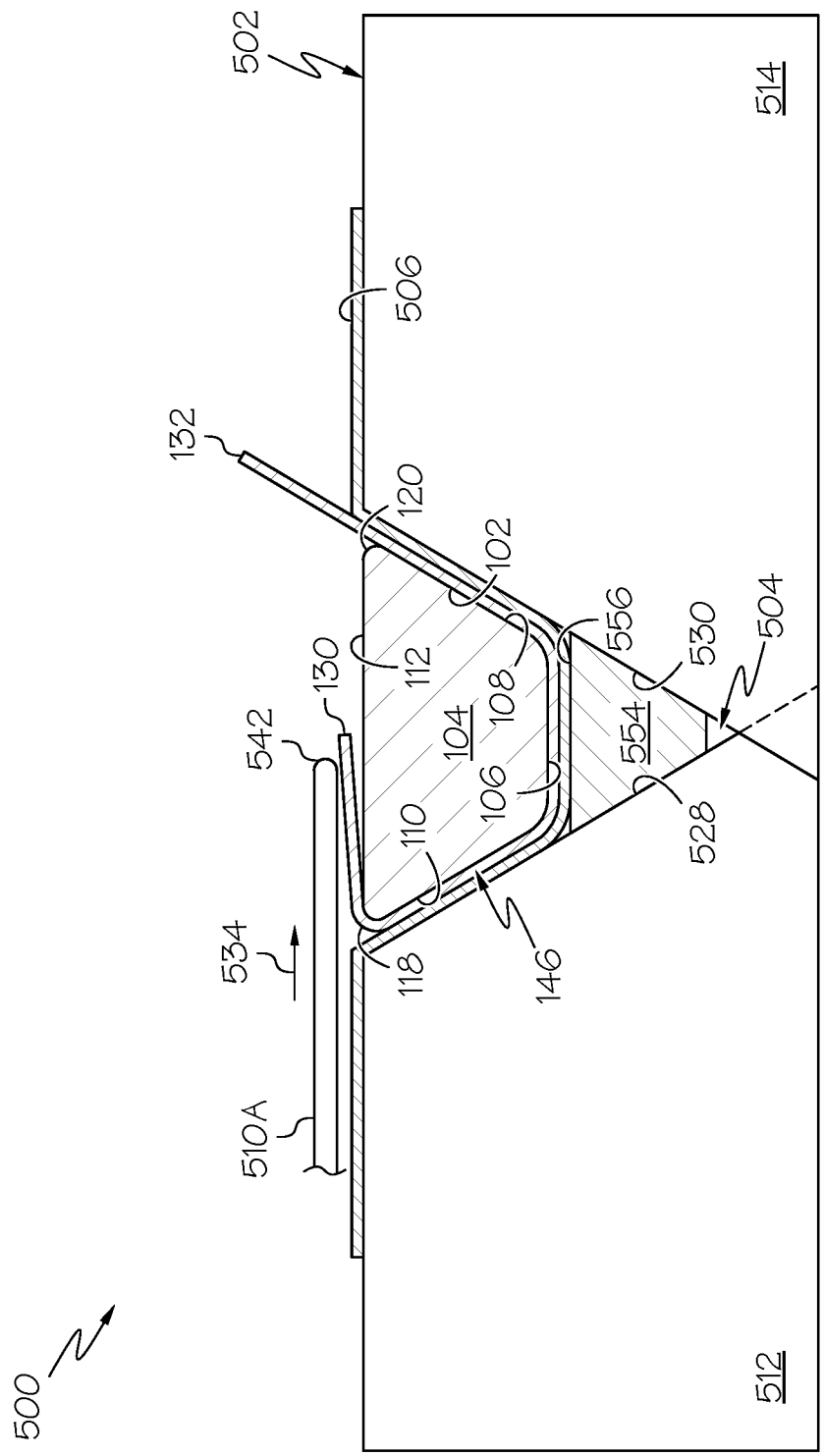

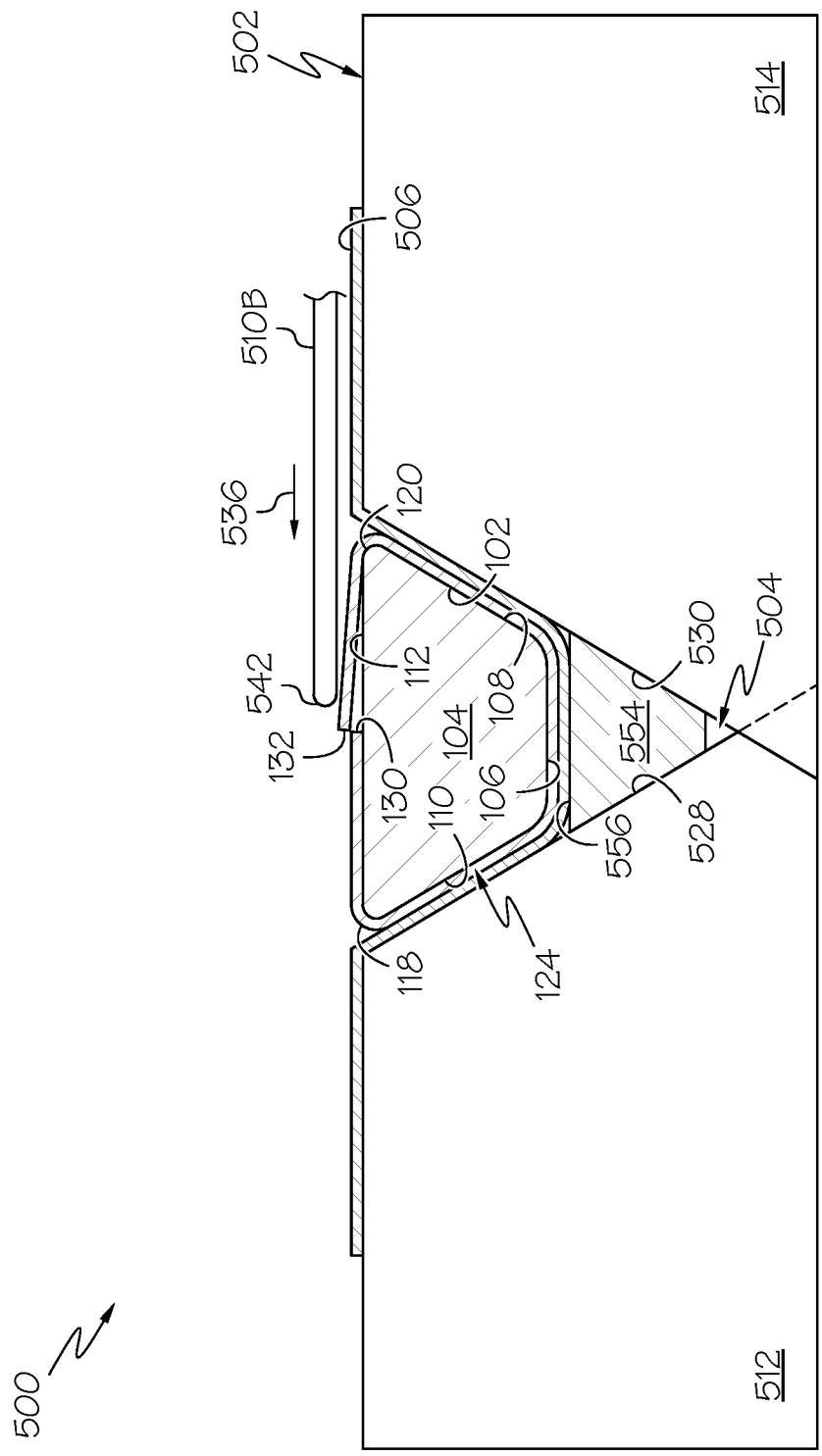

BLADDER MANDREL PACKAGE

PRIORITY

This application is a divisional of U.S. Ser. No. 16/224,969 filed on Dec. 19, 2018.

FIELD

The present disclosure is generally related to composite manufacturing and, more particularly, to a bladder mandrel package used for manufacturing a composite structure. More particularly, the present disclosure is related to an apparatus and method for manufacturing a bladder mandrel package.

BACKGROUND

Aircraft generally include an airframe, which may be regarded as an underlying skeleton to which skins are attached to form a smooth aerodynamic outer surface. Stringers of various shapes may be used for stiffening fuselage sections and wing skins on aircraft. Composite materials are used in aircraft to decrease the weight of the aircraft. Modern aircraft may include both composite stringers and composite skins.

Conventionally, composite stringers are attached to a composite skin using fasteners, curing the composite stringers to the composite skin, or a combination of the two. In some conventional processes, composite stringers are assembled on a cure tool common to both the composite stringers and the composite skin.

To assemble the composite stringers on the cure tool, a number of processes are performed, each of which has an associated performance time. Each stringer component is laid onto the cure tool and then compacted separately. Each process associated with assembling the composite stringers adds to an overall manufacturing time. Manufacturing time may limit a quantity of aircraft produced.

Fabrication of a composite structure having a closed cross-section or a partially closed cross-section involves placing a tool inside an at least partially trapped cavity. An at least partially trapped cavity makes removal of the tool undesirably difficult. A solid mandrel cannot be used without a straight, line of sight, extraction path from the composite structure.

Accordingly, those skilled in the art continue with research and development efforts in the field of composite manufacturing and, as such, apparatuses and methods, intended to address the above-identified concerns, would find utility.

SUMMARY

The following is a non-exhaustive list of examples, which may or may not be claimed, of the subject matter according to the present disclosure.

In an example, a disclosed method of manufacturing a bladder mandrel package, used to manufacture a composite structure, includes steps of: (1) placing a wrap ply over a cavity of a die tool; (2) placing a mandrel onto the wrap ply; (3) pressing the mandrel and the wrap ply into the cavity; (4) wrapping the wrap ply around the mandrel to form a wrapped mandrel; (5) placing a first radius filler at a first radius of the wrapped mandrel; (6) placing a second radius filler at a second radius of wrapped mandrel; and (7) consolidating the mandrel, the wrap ply, the first radius filler, and the second radius filler to form the bladder mandrel package.

In an example, a disclosed method of manufacturing a composite structure includes steps of: (1) placing a composite charge over a bladder mandrel package; (2) shaping the composite charge to the bladder mandrel package and a backing plate to form a stringer layup; and (3) compacting the stringer layup to form a compacted stringer package.

In an example, a disclosed bladder mandrel package, used to manufacture a composite structure, includes a mandrel and a wrap ply, surrounding the mandrel to form a wrapped mandrel. The bladder mandrel package also includes a first radius filler, coupled to the wrap ply at a first radius of the wrapped mandrel, and a second radius filler coupled to the wrap ply at a second radius of the wrapped mandrel. The mandrel, the wrap ply, the first radius filler, and the second radius filler are consolidated to from the bladder mandrel package.

In an example, a disclosed apparatus, used to manufacture a bladder mandrel package, includes a die tool to form a partially wrapped mandrel and sweep arms, movable relative to the die tool, to form a wrapped mandrel. The apparatus also includes a radius filler placement mechanism to place a first radius filler and a second radius filler on the wrapped mandrel. The apparatus further includes a consolidating mechanism to form the bladder mandrel package.

Other examples of the disclosed system and method will become apparent from the following detailed description, the accompanying drawings and the appended claims.

BRIEF DESCRIPTION OF THE DRAWINGS

FIG. 6A is a schematic illustration of an example of the apparatus depicting an example of another portion of the mandrel wrapped with the wrap ply;

FIG. 6B is a schematic illustration of the apparatus depicting an example of another portion of the mandrel wrapped with the wrap ply;

DETAILED DESCRIPTION

Figure 1:
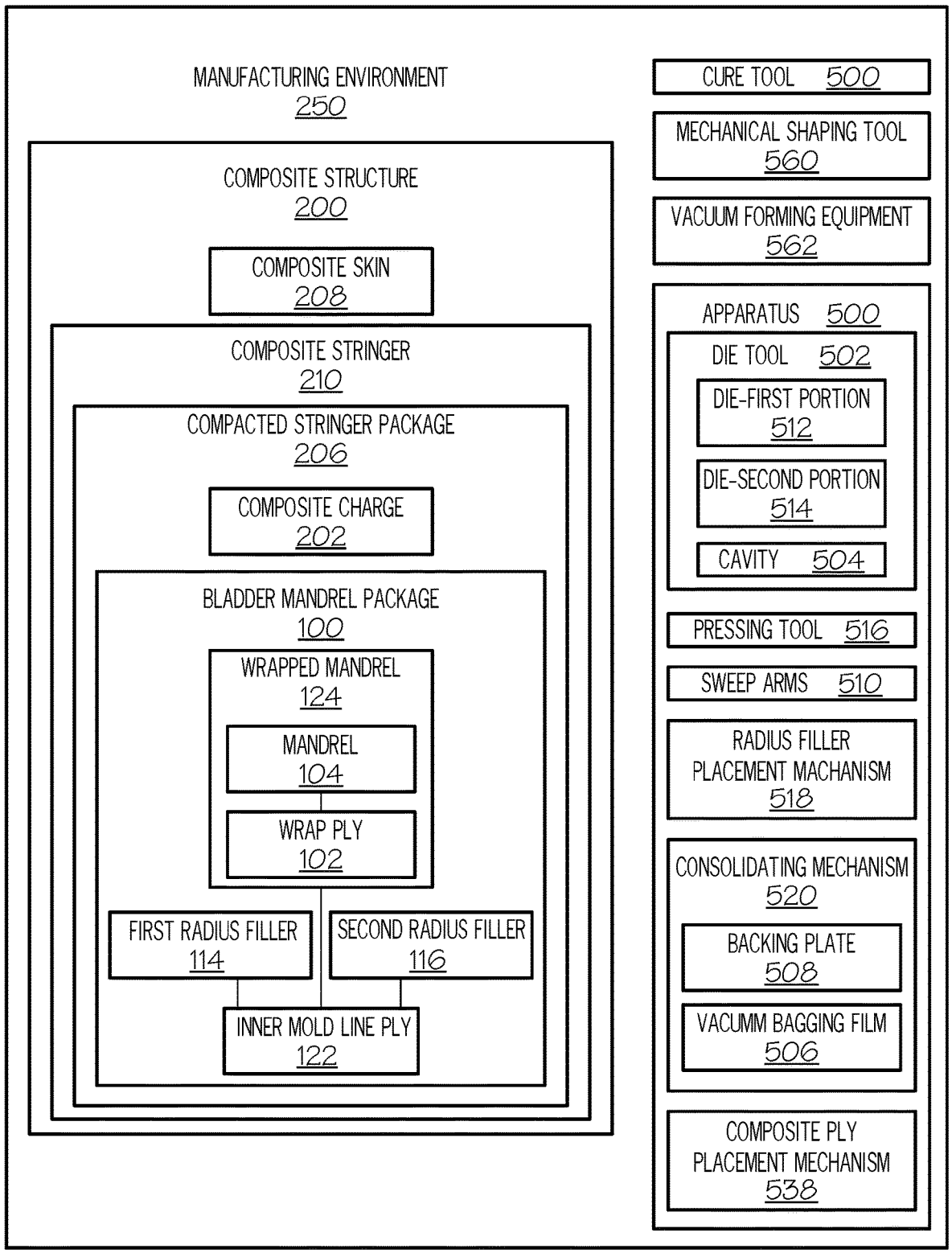
FIG. 1 is a schematic block diagram of an example of a manufacturing environment.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrases "an example," "one or more examples," and similar language throughout the present disclosure may, but do not necessarily, refer to the same example. Further, the subject matter characterizing any one example may, but does not necessarily, include the subject matter characterizing any other example.

Referring generally to FIGS. 1-17, the present disclosure provides examples of a bladder mandrel package 100 and a composite structure 200 manufactured using the bladder mandrel package 100. In one or more examples, the composite structure 200 is a component of an aircraft, such as a stiffener of the aircraft. In an example, the composite structure 200 includes a composite stringer 210 formed using the bladder mandrel package 100.

FIG. 1 illustrates an example of a manufacturing environment 250. Examples of the bladder mandrel package 100 used to form the composite structure 200 are manufactured (e.g., formed or made) in the manufacturing environment 250. Similarly, examples of the composite structure 200 formed using the bladder mandrel package 100 are manufactured in the manufacturing environment 250.

Figure 2:
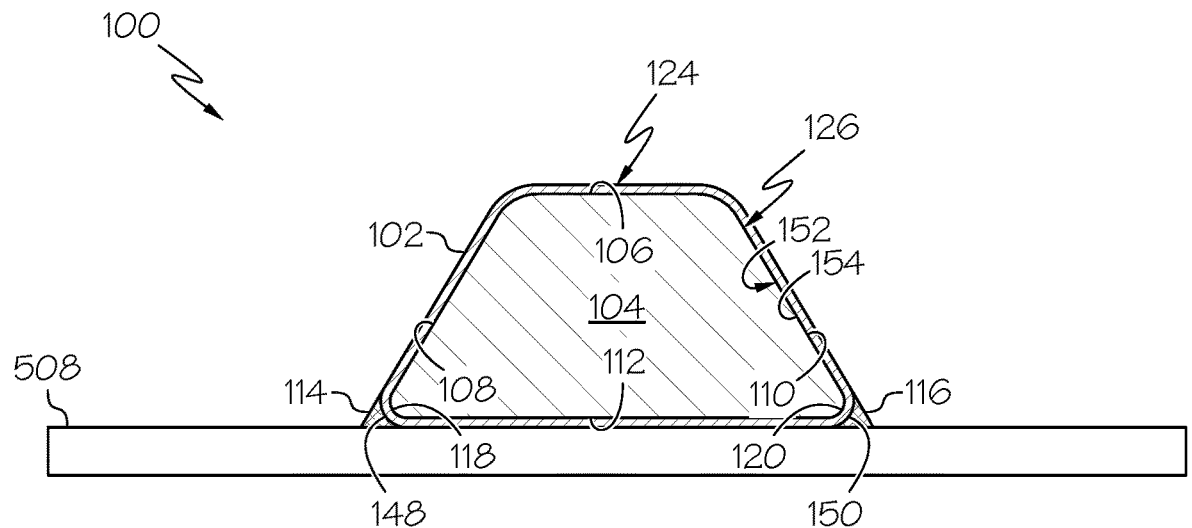
FIG. 2 is a schematic illustration of an example of a bladder mandrel package.
Figure 3:
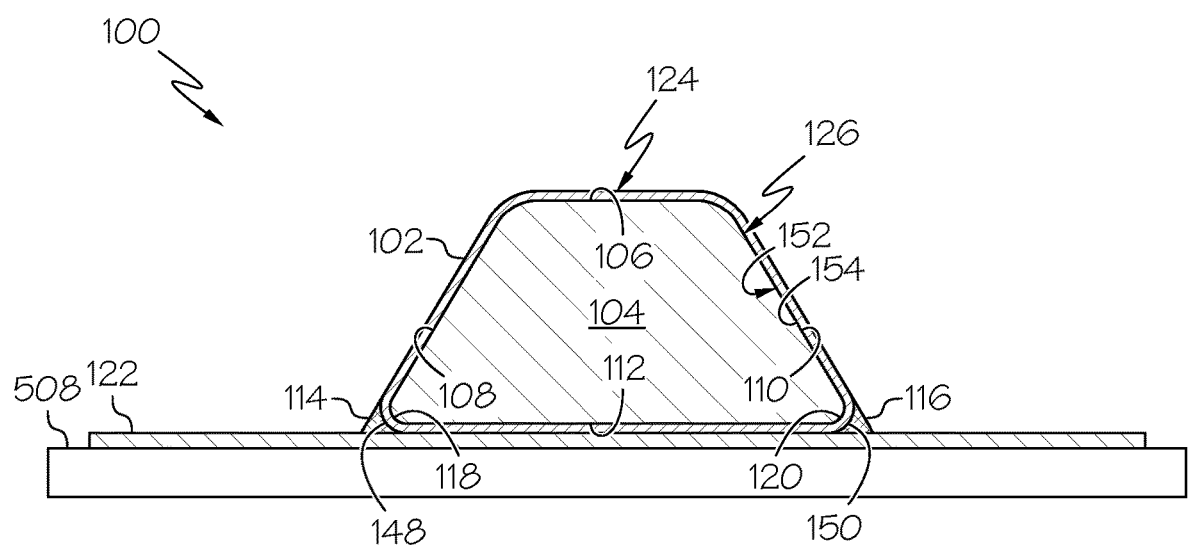
FIG. 3 is a schematic illustration of another example of the bladder mandrel package.

Referring to FIGS. 1-3, in an example, the bladder mandrel package 100 includes a mandrel 104. The mandrel 104 may have any one of various cross-sectional shapes and/or geometries. Generally, the shape of the mandrel 104 corresponds to and complements at least a portion of a cross-sectional shape of the composite structure 200 formed using the bladder mandrel package 100. For example, the geometry of the composite structure 200, such as the geometry of the composite stringer 210, drives design of the geometry of the mandrel 104. The mandrel 104 and, thus, the bladder mandrel package 100 are formed with geometry suitable to result in the desired geometry of the composite structure 200. In the illustrative examples, the mandrel 100 has a trapezoidal shape in cross-section. In such examples, the composite stringer 210 formed using the bladder mandrel package 100 has a hat-shaped cross-section.

As illustrated in FIGS. 2 and 3, in an example, the mandrel 104 has an isosceles trapezoidal shape in cross-section. For example, the mandrel 104 includes a bottom surface 112, a top surface 106 that is opposite and parallel to the bottom surface 112, a first side surface 108, and a second side surface 110 that is opposite the first side surface 108.

As illustrated in FIGS. 2 and 3, in an example, one or more corners of the mandrel 104 are radiused (i.e., the corner or edge is rounded and has a radius). In the illustrative examples, the mandrel 104 has a first radius 118 (e.g., a first radiused corner), formed at an intersection of the bottom surface 112 and the first side surface 108, and a second radius 120 (e.g., a second radiused corner), formed at an intersection of the bottom surface 112 and the second side surface 110.

In another example, one or more of the corners of the mandrel 104 may be a sharp corner.

Referring to FIGS. 1-3, in an example, the bladder mandrel package 100 includes a wrap ply 102. The wrap ply 102 surrounds the mandrel 104 to form a wrapped mandrel 124. In an example, the wrap ply 102 is made of a composite material. As illustrated in FIGS. 2 and 3, the wrap ply 102 is wrapped around an exterior surface 126 of the mandrel 104. In other words, the wrap ply 102 is wrapped around the top surface 106, the first side surface 108, the second side surface 110, and the bottom surface 112.

In an example, the wrap ply 102 includes, or is formed of, a number of plies, or sheets, of a composite material. As used herein, the phrase "a number of" means one or more items. Each ply of the composite material includes reinforcing fibers bound in a polymer resin matrix. Resins used in the composite material may include thermoplastic or thermoset resins. The fibers may be unidirectional or may take the form of a woven cloth or fabric. The fibers of the composite material of different plies of the wrap ply 102 may have the same fiber orientation or different orientations.

In an example, when wrapped around the mandrel 104, the wrap ply 102 has a cross-sectional shape formed by the cross-sectional shape of the mandrel 104. In the illustrative example, when wrapped around the mandrel 104, the wrap ply 102 has a trapezoidal cross-section formed by the mandrel 104. The wrap ply 102 may help maintain the shape of the composite structure 200 during formation.

As illustrated in FIGS. 2 and 3, in an example, one or more of the corners of the wrapped mandrel 124 is radiused (i.e., the corner or edge is rounded and has a radius). The radius is due to the wrap ply 102 being folded, or wrapped, around the radiused corner of the mandrel 104. In the illustrative examples, the wrapped mandrel 124 has the first radius 118 (e.g., a first radiused corner 148), formed at an intersection of a portion of the wrap ply 102 covering the bottom surface 112 of the mandrel 104 and a portion of the wrap ply 102 covering the first side surface 108 of the mandrel 104, and the second radius 120 (e.g., a second radiused corner 150), formed at an intersection of the portion of the wrap ply 102 covering the bottom surface 112 and a portion of the wrap ply 102 covering the second side surface 110 of the mandrel 104.

Referring to FIGS. 1-3, in an example, the bladder mandrel package 100 includes a first radius filler 114 and a second radius filler 116. In an example, the first radius filler 114 and the second radius filler 116 are made of a composite material. As illustrated in FIGS. 2 and 3, the first radius filler 114 is coupled to the wrap ply 102 at the first radius 118 of the wrapped mandrel 124. The second radius filler 116 is coupled to the wrap ply 102 at the second radius 120 of the wrapped mandrel 124. The first radius filler 114 and the second radius filler 116 conform to the curvature at a junction of perpendicular components of the composite structure 200. The first radius filler 114 and the second radius filler 116 may be commonly referred to as "noodles."

In an example, each of the first radius filler 114 and the second radius filler 116 includes, or is formed of, a polymer resin material. In another example, each of the first radius filler 114 and the second radius filler 116 includes non-woven fibers bound in the polymer resin material. Generally, the polymer resin material of the first radius filler 114 and the second radius filler 116 and the polymer resin matrix of the wrap ply 102 are compatible.

As illustrated in FIG. 2, the mandrel 104, the wrap ply 102, the first radius filler 114, and the second radius filler 116 are consolidated, or compacted, to form the bladder mandrel package 100. In an example, pressure, or a force, is applied to the first radius filler 114, the second radius filler 116, the wrap ply 102, and the mandrel 104 to consolidate the components into the compacted bladder mandrel package. In other words, pressure, or force, is applied to the first radius filler 114, the second radius filler 116, and the wrap ply 102 and is reacted by the exterior surface 126 of the mandrel 104 to compact the wrap ply 102, the first radius filler 114, and the second radius filler 116 against the mandrel 104.

In an example, following consolidation, the wrap ply 102 is adhered to the exterior surface 126 of the mandrel 104. In other words, the wrap ply 102 is adhered to the top surface 106, the first side surface 108, the second side surface 110, and the bottom surface 112. The wrap ply 102 may be adhered to the mandrel 104 by the inherent tackiness of the composite material forming the wrap ply 102 or by use of a secondary bonding agent (e.g., an adhesive). In another example, following consolidation, the wrap ply 102 is not adhered to the exterior surface 126 of the mandrel 104. In such examples, the wrapped mandrel 124 and, thus, the bladder mandrel package 100 include one or more additional layers of material 152 (FIGS. 2 and 3) located between the mandrel 104 and the wrap ply 102. The one or more additional layers of material 152 may be wrapped around the mandrel 104 prior to wrapping the mandrel 104 with the wrap ply 102. For example, the bladder mandrel package 100 may include a release ply 154 (FIGS. 2 and 3), configured to prevent adhesion of the wrap ply 102 to the mandrel 104 during consolidation among other layers of material.

In an example, following consolidation, the first radius filler 114 and the second radius filler 116 are adhered to the wrap ply 102. The first radius filler 114, the second radius filler 116, and the wrap ply 102 may be adhered together by the inherent tackiness of the composite material forming the first radius filler 114, the second radius filler 116, and/or the wrap ply 102 or by use of a secondary bonding agent (e.g., an adhesive).

Referring to FIGS. 1 and 3, in an example, the bladder mandrel package 100 includes an inner mold line ply 122. In an example, the inner mold line ply 122 is made of a composite material. As illustrated in FIG. 3, the inner mold line ply 122 is coupled to the wrapped mandrel 124 (i.e., the mandrel 104 surrounded by the wrap ply 102), the first radius filler 114, and the second radius filler 116. The inner mold line ply 122 may help maintain the shape of the composite structure 200 during formation; for example, the inner mold line ply 122 may resist crushing during consolidation.

In an example, the inner mold line ply 122 is formed of a number of plies, or sheets, of a composite material. Each ply of the composite material includes reinforcing fibers bound in a polymer resin matrix. Resins used in the composite material may include thermoplastic or thermoset resins. The fibers may be unidirectional or may take the form of a woven cloth or fabric. The fibers of the composite material of different plies of the inner mold line ply 122 may have the same fiber orientation or different orientations. Generally, the polymer resin matrix of the inner mold line ply 122 is compatible with the polymer resin material of the first radius filler 114 and the second radius filler 116 and the polymer resin matrix of the wrap ply 102.

In an example, the fibers of the composite material of the wrap ply 102 and the fibers of the composite material of the inner mold line ply 122 have the same fiber orientation. In another example, the fibers of the composite material of the wrap ply 102 and the fibers of the composite material of the inner mold line ply 122 have different fiber orientations.

As illustrated in FIG. 3, the mandrel 104, the wrap ply 102, the first radius filler 114, the second radius filler 116, and the inner mold line ply 122 are consolidated, or compacted, to form the bladder mandrel package 100. In an example, pressure, or a force, is applied to the inner mold line ply 122, the first radius filler 114, the second radius filler 116, the wrap ply 102, and the mandrel 104 to consolidate the components into the compacted bladder mandrel package. In other words, pressure, or force, is applied to the wrap ply 102, the first radius filler 114, and the second radius filler 116 and is reacted by the exterior surface 126 of the mandrel 104 to compact the inner mold line ply 122, the first radius filler 114, the second radius filler 116, and the wrap ply 102 against the mandrel 104.

In an example, following consolidation, the inner mold line ply 122 is adhered to the first radius filler 114, the second radius filler 116, and the wrap ply 102. The inner mold line ply 122 may be adhered to the first radius filler 114, the second radius filler 116, and the wrap ply 102 by the inherent tackiness of the composite material forming inner mold line ply 122, the first radius filler 114, the second radius filler 116, and/or the wrap ply 102 or by use of a secondary bonding agent (e.g., an adhesive).

Referring to FIGS. 1-3, in an example, the bladder mandrel package 100 is formed, or is consolidated, on a backing plate 508. In such an example, the bladder mandrel package 100 is removably coupled to the backing plate 508 following consolidation.

As illustrated in FIG. 2, in an example, wrapped mandrel 124 (i.e., the mandrel 104 surrounded by the wrap ply 102), the first radius filler 114, and the second radius filler 116 are consolidated onto a surface of the backing plate 508. In an example, following consolidation to form the bladder mandrel package 100, the wrap ply 102, the first radius filler 114 and the second radius filler 116 are adhered to the surface of the backing plate 508. In another example, following consolidation, the bladder mandrel package 100 is secured to the backing plate 508 using an active vacuum applied through the backing plate 508.

As illustrated in FIG. 3, in an example, the wrapped mandrel 124 (i.e., the mandrel 104 surrounded by the wrap ply 102), the first radius filler 114, the second radius filler 116, and the inner mold line ply 122 are consolidated onto the surface of the backing plate 508. In an example, following consolidation to form the bladder mandrel package 100, inner mold line ply 122 is adhered to the surface of the backing plate 508. In another example, following consolidation, the bladder mandrel package 100 is secured to the backing plate 508 using an active vacuum applied through the backing plate 508.

Referring to FIGS. 1 and 4-10, the present disclosure also provides examples of an apparatus 500 used to manufacture the bladder mandrel package 100. In an example, the bladder mandrel package 100 includes, or is, the consolidated components of the mandrel 104, the wrap ply 102, surrounding the mandrel 104 to form the wrapped mandrel 124, the first radius filler 114, coupled to the wrap ply 102 at the first radius 118 of the wrapped mandrel 124, and the second radius filler 116, coupled to the wrap ply 102 at the second radius 120 of the wrapped mandrel 124, and, optionally, when present, the inner mold line ply 122, coupled to the wrapped mandrel 124, the first radius filler 114, and the second radius filler 116.

In an example, the apparatus 500 is configured to wrap the wrap ply 102 around the mandrel 104 to form the wrapped mandrel 124. In an example, the apparatus 500 is also configured to wrap the one or more additional layers of material 152, such as the release ply 154, illustrated in FIGS. 2 and 3, around the mandrel 104. Wrapping the mandrel 104 with the one or more additional layers of material 152 may be performed prior to wrapping the mandrel 104 with the wrap ply 102 or concurrently with the wrap ply 102. In an example, the apparatus 500 is a further configured to place the first radius filler 114 and the second radius filler 116 on the wrapped mandrel 124. In an example, the apparatus 500 is also configured to place the inner mold line ply 122, when present, on the first radius filler 114, the second radius filler 116, and the wrapped mandrel 124. In an example, the apparatus 500 is additionally configured to consolidate the first radius filler 114, the second radius filler 116, the wrap ply 102, and, optionally, the inner mold line ply 122, when present, against the mandrel 104 to form the compacted bladder mandrel package 100.

Figure 4:
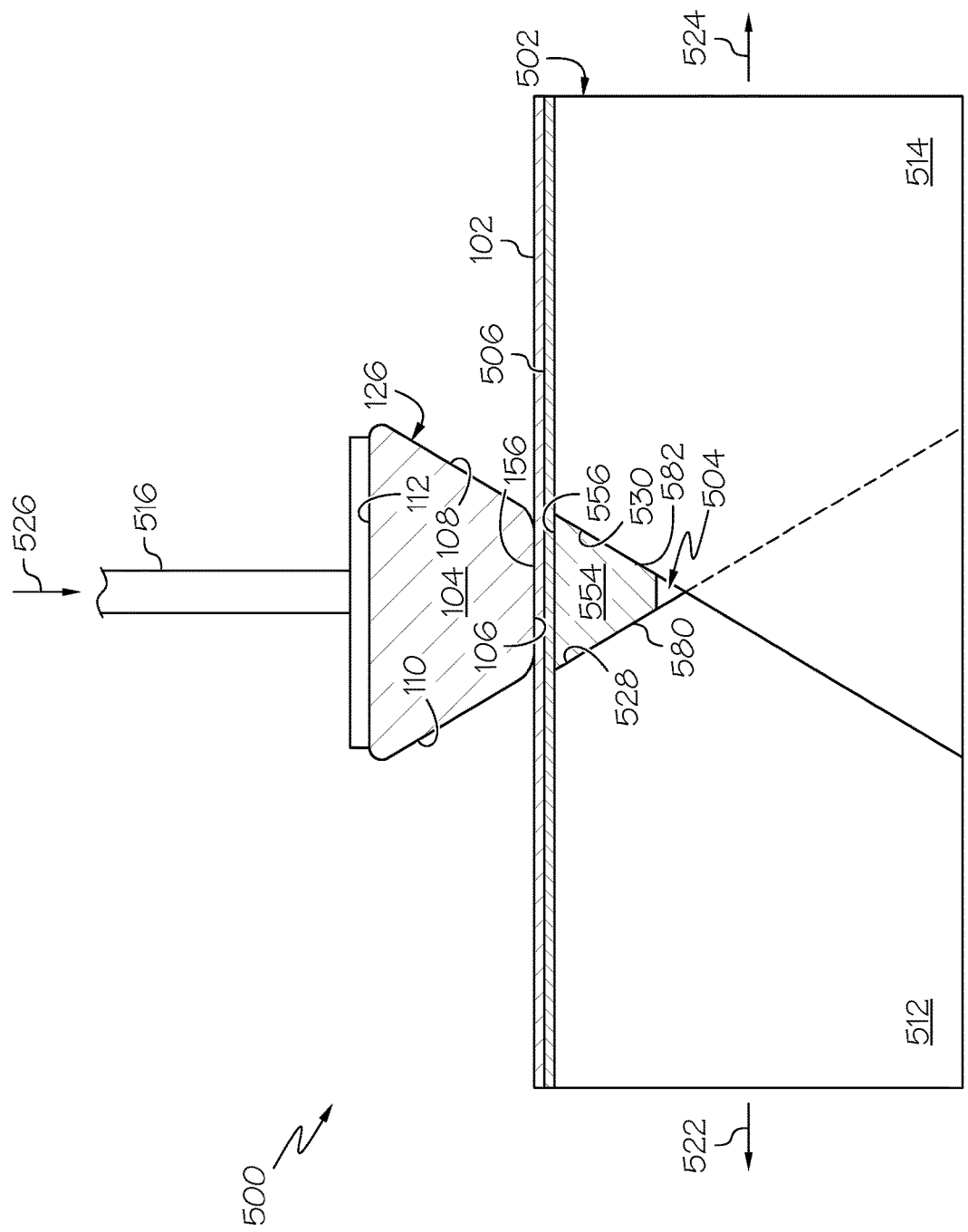
FIG. 4 is a schematic illustration of an example of an apparatus for manufacturing the bladder mandrel package depicting examples of a mandrel and a wrap ply prior to wrapping.
Figure 5:
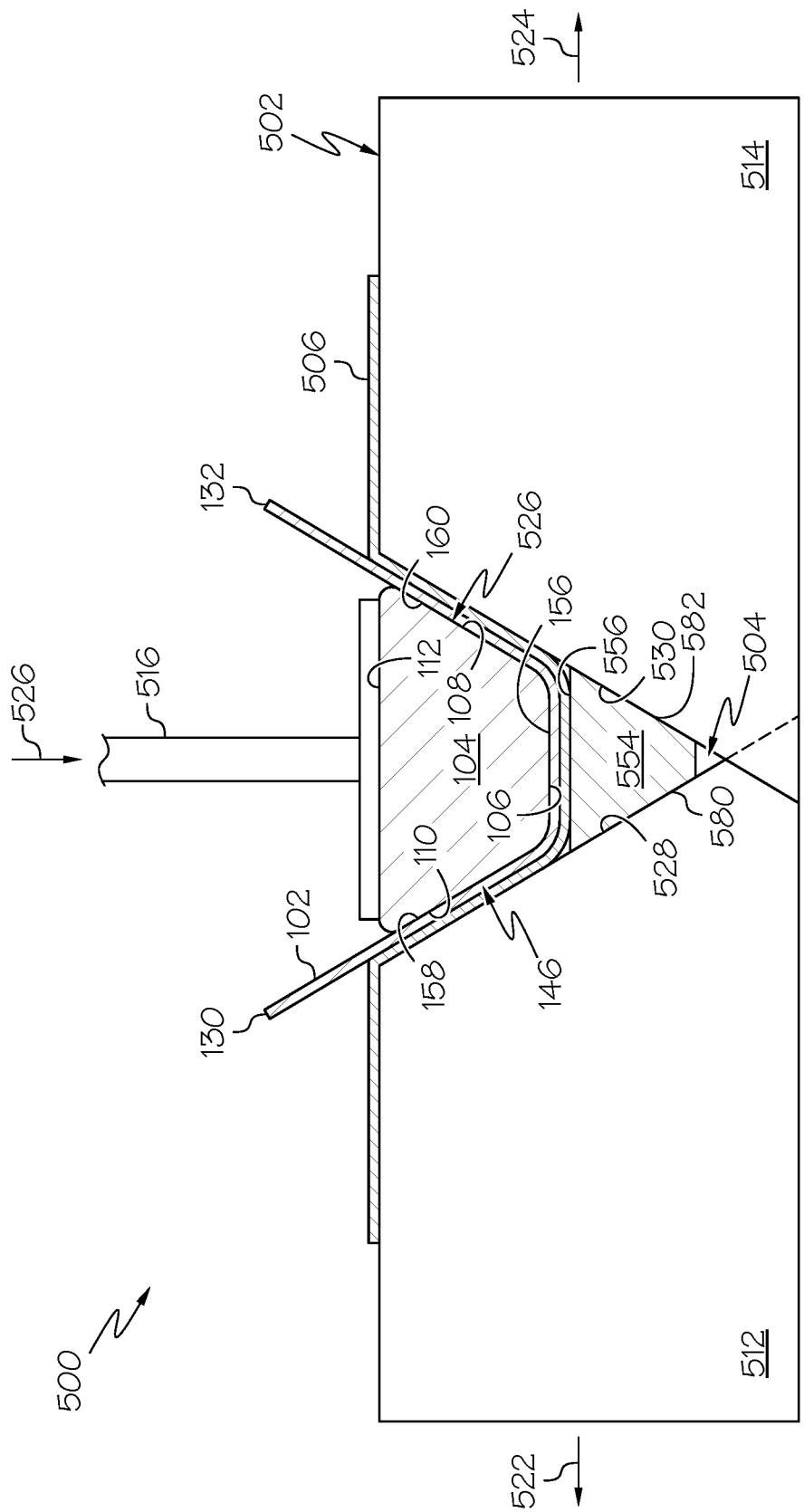
FIG. 5 is a schematic illustration of an example of the apparatus depicting an example of a portion of the mandrel wrapped with the wrap ply.

As illustrated in FIGS. 4 and 5, in an example, the apparatus 500 includes a die tool 502. The die tool 502 includes a die-first portion 512 and a die-second portion 514. The die-first portion 512 and the die-second portion 514 define a cavity 504. In other words, the cavity 504 is formed between the die-first portion 512 and the die-second portion 514. The wrap ply 102 of the bladder mandrel package 100 and the mandrel 104 of the bladder mandrel package 100 are pressed into the cavity 504 to partially wrap the wrap ply 102 around the exterior surface 126 of the mandrel 104.

As illustrated in FIGS. 4 and 5, in an example, the die-first portion 512 and the die-second portion 514 are movable relative to each other. For example, the die-first portion 512 and the die-second portion 514 are configured to move away from each other, for example, in the directions of directional arrow 522 and directional arrow 524, respectively, to enlarge the cavity 504 when the wrap ply 102 of the bladder mandrel package 100 and the mandrel 104 of the bladder mandrel package 100 are pressed into the cavity 504, as illustrated in FIG. 5.

In an example, the die-first portion 512 includes a first tooling surface 528 and the die-second portion 514 includes a second tooling surface 530. The first tooling surface 528 and the second tooling surface 530 at least partially form the cavity 504. The first tooling surface 528 is complementary to (e.g., has a complementing geometry relative to) a portion of the mandrel 104. For example, the first tooling surface 528 has an angle, or a slope, which is complementary to an angle, or a slope, of the second side surface 110 of the mandrel 104. The second tooling surface 530 is complementary to (e.g., has a complementing geometry relative to) another portion of the mandrel 104. For example, the second tooling surface 530 has an angle, or a slope, which is complementary to an angle, or a slope, of the first side surface 108 of the mandrel 104.

As illustrated in FIGS. 4 and 5, in an example, the apparatus 500 also includes a wedge 554. The wedge 554 may be formed of any suitable, rigid material, such as a metallic material, a plastic material, and the like. The wedge 554 is located in the cavity 504 and is movable relative to the die tool 502 when the wrap ply 102 and the mandrel 104 are pressed into the cavity 504 and the cavity 504 enlarges due to movement of the die-first portion 512 and the die-second portion 514. In an example, the wedge 554 has geometry, such as a trapezoidal shape in cross-section, which is complimentary to a cross-sectional shape of the cavity 504 so that a first side 580 of the wedge 554 engages the first tooling surface 528 and an opposing, second side 582 of the wedge 554 engages the second tooling surface 530. In an example, the first side 580 of the wedge 554 has an angle, or a slope, which is approximately the same as the angle, or slope, of the second side surface 110 of the mandrel 104 and the second side 582 of the wedge 554 has an angle, or a slope, which is approximately the same as the angle, or slope, of the first side surface 108 of the mandrel 104.

As illustrated in FIGS. 4 and 5, in an example, the wedge 554 includes a third tooling surface 556. The third tooling surface 556 of the wedge 554 is complementary to (e.g., has a complementing geometry relative to) a portion of the mandrel 104, such as the top surface 106 of the mandrel 104. As illustrated in FIG. 4, the wedge 554 supports a central portion 156 of the wrap ply 102 placed over the cavity 504 and prevents the wrap ply 102 from drooping or sagging into the cavity 504. Further, the wedge 554 may facilitate use of net trim and pick and place machines to cut the wrap ply 102 to a desired dimension and transfer the wrap ply 102 to the die tool 502. Additionally, with the wrap ply 102 coupled to the wedge 554 (e.g., tacked to the wedge 554 by the tackiness of the wrap ply 102), the wedge 554 also facilitates proper positioning and indexing of the trimmed wrap ply 102 by locating the wedge 554 within the cavity 504. Moreover, the wedge 554 is configured so that it primes the process of driving, or pressing, the mandrel 104 and the wrap ply 102 between the die-first portion 512 and the die-second portion 514 without placing a significant load on the wrap ply 102. In other words, the wedge 554 enables the wrap ply 102 and the mandrel 104 to be driven down between the die-first portion 512 and the die-second portion 514 such that the wedge 554 deals with most of a friction related load in separating die-first portion 512 and die-second portion 514 so that the friction related load is primarily dealt with between the first tooling surface 528 of die-first portion 512 and the corresponding first side 580 of the wedge 554 and between the second tooling surface 530 of die-second portion 514 and the corresponding second side 582 of the wedge 554. Optionally, in an example, a suitable lubricant that does not contaminate the wrap ply 102 may be used to reduce friction related load.

As illustrated in FIG. 4, when the wrap ply 102 and the mandrel 104 are initially pressed into the cavity 504, the central portion 156 of the wrap ply 102 is sandwiched between the mandrel 104 and the third tooling surface 556 and the third tooling surface 556 reacts to the mandrel 104 to hold the wrap ply 102 in place relative to the mandrel 104. As further illustrated in FIG. 5, in an example, when the wrap ply 102 and the mandrel 104 are pressed further into the cavity 504, the central portion 156 of the wrap ply 102 is sandwiched between the mandrel 104 and the third tooling surface 556, a first intermediate portion 158 of the wrap ply 102 is sandwiched between the mandrel 104 and the first tooling surface 528, and a second intermediate portion 160 of the wrap ply 102 is sandwiched between the mandrel 104 and the second tooling surface 530. Movement of the die-first portion 512 and the die-second portion 514 away from each other exposes more of the first tooling surface 528 and the second tooling surface 530.

Figure 27:
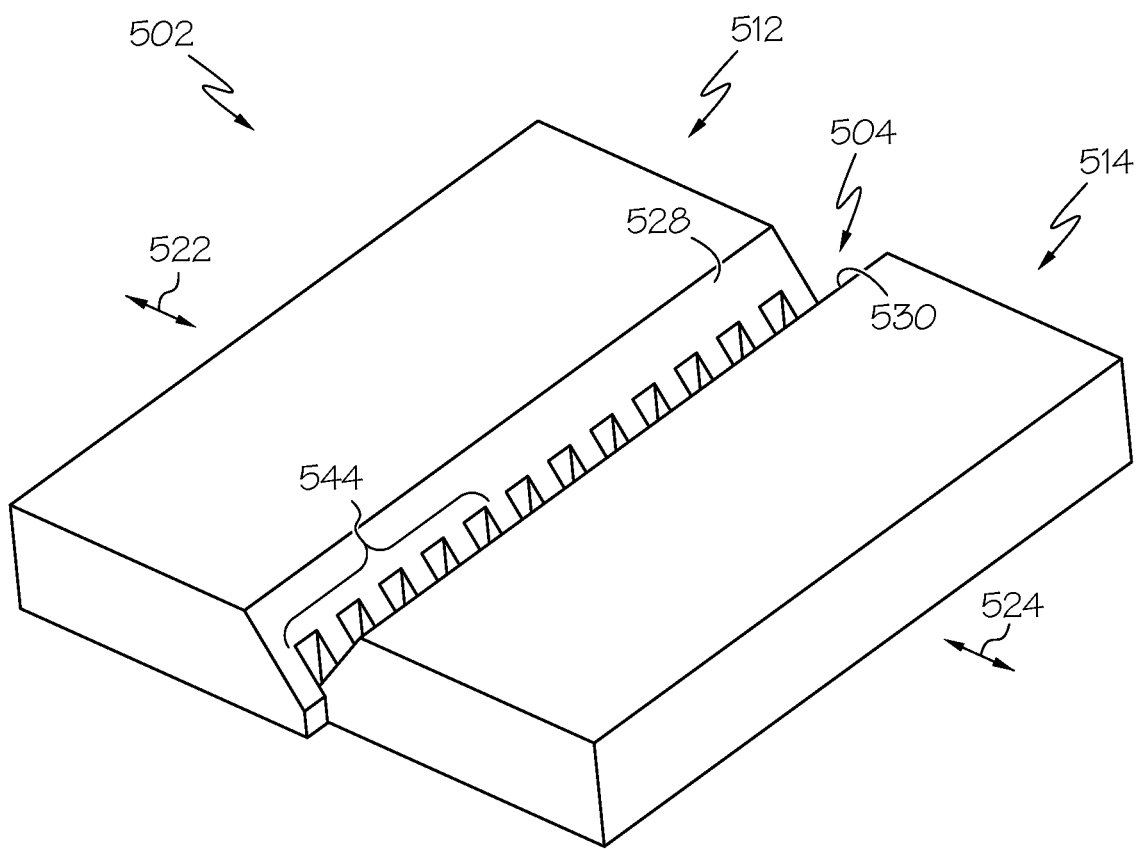
FIG. 27 is a schematic, perspective view of an example of a die tool of the apparatus for manufacturing the bladder mandrel package.
Figure 28:
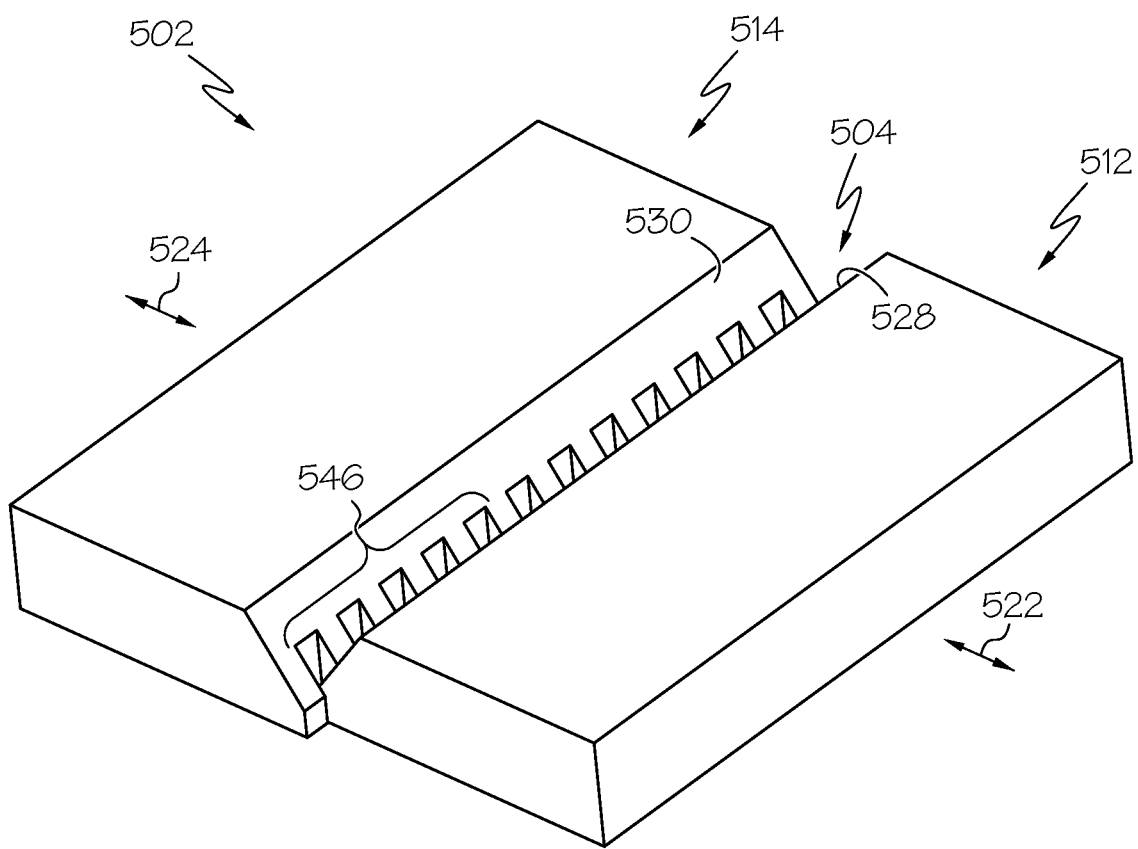
FIG. 28 is a schematic, opposing, perspective view of the die tool of FIG. 27.

FIGS. 27 and 28 illustrate opposing, isometric views of an example of the die-first portion 512 and the die-second portion 514 of the die tool 502, depicted in FIGS. 4-10, with all other structural components of the apparatus 500 and the components of the bladder mandrel package 100 removed. As illustrated in FIGS. 27 and 28, in an example, the die-first portion 512 includes a number of first interleafing fingers 544 (FIG. 27). The first interleafing fingers 544 extend from the first tooling surface 528. The die-second portion 514 includes a number of second interleafing fingers 546 (FIG. 28). The second interleafing fingers 546 extend from the second tooling surface 530.

As illustrated in FIGS. 27 and 28, the first tooling surface 528 of the die-first portion 512 and the second tooling surface 530 of the die-second portion 514 define the cavity 504. The first interleafing fingers 544 and the second interleafing fingers 546 overlap and matingly engage with each other during movement of the die-first portion 512 and the die-second portion 514 relative to each other, such as in the directions of directional arrow 522 and directional arrow 524, respectively. When the die-first portion 512 and the die-second portion 514 are moved closer together, such as depicted in FIG. 4, there is more interleafing of the die-first portion 512 and the die-second portion 514 (e.g., more overlapping of the first interleafing fingers 544 and the second interleafing fingers 546). When the die-first portion 512 and the die-second portion 514 are moved farther apart, for example, when the wrap ply 102 and the mandrel 104 are pressed into the cavity 504, such as depicted in FIG. 5, there is less interleafing of the die-first portion 512 and the die-second portion 514 (e.g., less overlapping of the first interleafing fingers 544 and the second interleafing fingers 546). In other words, the interleafing of the die-first portion 512 and the die-second portion 514 decreases when the die-first portion 512 and the die-second portion 514 move from the position depicted in FIG. 4 to the position depicted in FIG. 5. Conversely, the interleafing of the die-first portion 512 and the die-second portion 514 increases when the die-first portion 512 and the die-second portion 514 move from the position depicted in FIG. 5 to the position depicted in FIG. 4.

In an example, the die-first portion 512 and the die-second portion 514 are suitably sized so that the components of the bladder mandrel layup 128 (FIGS. 9 and 10) are supported by and are in contact with only the first tooling surface 528 and the second tooling surface 530, rather than in contact with the first interleafing fingers 544 and the second interleafing fingers 546 (FIGS. 27 and 28). For example, when the wrap ply 102 and the mandrel 104 are pressed into the cavity 504 and the die-first portion 512 and the die-second portion 514 move away from each other (e.g., separate to enlarge the cavity 504), as illustrated in FIG. 5, the vacuum bagging film 506, the wrap ply 102, and the first side surface 108 and the second side surface 110 of the mandrel 104 are supported by the first tooling surface 528 and the second tooling surface 530, respectively. This configuration prevents portions of the vacuum bagging film 506 and the wrap ply 102 from being unsupported by extending across the first interleafing fingers 544 and the second interleafing fingers 546 and, thus, avoids potential bridging issues.

As will be described in greater detail herein, in one or more examples, the apparatus 500 includes a vacuum-bagging device that facilitates application of vacuum pressure during consolidation to form the bladder mandrel package 100. As illustrated in FIGS. 4 and 5, in such examples, a vacuum bagging film 506 is placed over the cavity 504 between the wrap ply 102 and the die tool 502. As illustrated in FIG. 4, in an example, the wedge 554 supports a portion of the vacuum bagging film 506 placed over the cavity 504 and prevents the vacuum bagging film 506 from drooping or sagging into the cavity 504. In an example, the vacuum bagging film 506 reduces, or eliminates, any undesirable friction issues between the wrap ply 102 and the first tooling surface 528 of die-first portion 512 and between the wrap ply 102 and the second tooling surface 530 of die-second portion 514. In an example, friction between the vacuum bagging film 506 and the first tooling surface 528 and the second tooling surface 530 is managed to prevent deformation or split of the vacuum bagging film 506. As illustrated in FIG. 5, in an example, when the vacuum bagging film 506, the wrap ply 102, and the mandrel 104 are pressed into the cavity 504, a portion of the vacuum bagging film 506 is sandwiched between the wrap ply 102 and the third tooling surface 556, a portion of the vacuum bagging film 506 is sandwiched between the wrap ply 102 and the first tooling surface 528, and another portion of the vacuum bagging film 506 is sandwiched between the wrap ply 102 and the second tooling surface 530.

As illustrated in FIGS. 1, 4, and 5, in an example, the apparatus 500 includes a pressing tool 516. The pressing tool 516 is movable relative to the die tool 502. The pressing tool 516 is configured to press the wrap ply 102 of the bladder mandrel package 100 and the mandrel 104 of the bladder mandrel package 100 into the cavity 504 and against the first tooling surface 528 of the die-first portion 512, the second tooling surface 530 of the die-second portion 514, and the third tooling surface 556 of the wedge 554, when the wedge 554 is present. In an example, the pressing tool 516 is configured to move linearly, for example, in the direction of directional arrow 526, to press the wrap ply 102 and the mandrel 104 into the cavity 504 and into contact with respective ones of the first tooling surface 528 of the die-first portion 512, the second tooling surface 530 of the die-second portion 514, and the third tooling surface 556 of the wedge 554, when present.

As illustrated in FIG. 5, when the pressing tool 516 presses the wrap ply 102 and the mandrel 104 into the cavity 504, the die-first portion 512 and the die-second portion 514 move away from each other, for example, in the directions of directional arrow 522 and directional arrow 524, respectively, to accommodate the mandrel 104. When the pressing tool 516 presses the wrap ply 102 and the mandrel 104 into the cavity 504, contact with the die-first portion 512 and the die-second portion 514 sweeps a portion of the wrap ply 102 over a portion of the exterior surface 126 of the mandrel 104. As used herein, the terms "sweep," "sweeping," and similar terms means to pass over a surface with a steady, driving movement or with a continuous stroke.

As illustrated in FIG. 4, in an example, the wrap ply 102 is located over the cavity 504 and the mandrel 104 is located over the wrap ply 102. When the pressing tool 516 presses the wrap ply 102 and the mandrel 104 into the cavity 504 and against the third tooling surface 556 of the wedge 554, when present, the wrap ply 102 covers the top surface 106 of the mandrel 104. As illustrated in FIG. 5, in an example, when the pressing tool 516 presses the wrap ply 102 and the mandrel 104 further into the cavity 504, the first tooling surface 528 of the die-first portion 512 sweeps a first portion of the wrap ply 102 over the mandrel 104 to cover the second side surface 110 of the mandrel 104 and the second tooling surface 530 of the die-second portion 514 sweeps a second portion of the wrap ply 102 over the mandrel 104 to cover the first side surface 108 of the mandrel 104, for example, to form a partially wrapped mandrel 146.

As illustrated in FIGS. 1, 6A, and 6B, in an example, the apparatus 500 includes sweep arms 510 (FIG. 1), identified individually at first sweep arm 510A and a second sweep arm 510B in FIGS. 6A and 6B, respectively. The sweep arms 510 are movable relative to the die tool 502. The sweep arms 510 are configured to sweep another portion (e.g., a remaining portion) of the wrap ply 102 over another portion (e.g., a remaining portion) of the exterior surface 126 of the mandrel 104 to surround the mandrel 104 with the wrap ply 102 and to form the wrapped mandrel 124.

As illustrated in FIG. 6A, in an example, the first sweep arm 510A moves, for example, in the direction of directional arrow 534, to engage a first end portion 130 of the wrap ply 102. The first sweep arm 510A continues moving toward, such as proximate to, the second radius 120 to sweep the first end portion 130 of the wrap ply 102 over a first portion of the bottom surface 112 of mandrel 104.

As illustrated in FIG. 6B, the second sweep arm 510B then moves, for example, in the direction of directional arrow 536, to engage an opposing, second end portion 132 of the wrap ply 102. The second sweep arm 510B continues moving toward, such as proximate to, the first radius 118 to sweep the second end portion 132 of the wrap ply 102 over a second portion of the bottom surface 112 of mandrel 104. The second sweep arm 510B is then retracted.

In an example, each one of the sweep arms 510 includes a plate member with a rounded end 542 that is configured to engage a portion of the wrap ply 102 when the sweep arm 510 moves toward an opposing radius of the mandrel 104. Due to the inherent resiliency of the wrap ply 102, tending to resist folding, and the tackiness of the wrap ply 102, contact engagement between the end 542 of the sweep arm 510 effectively grips and pulls the wrap ply 102 so that the wrap ply 102 is folded and swept onto the bottom surface 112 of the mandrel 104 during movement of the sweep arm 510. In another example, the end 542 of each one of the sweep arms 510 may include a gripping device configured to grab and pull the wrap ply 102 so that the wrap ply 102 is folded and swept onto the bottom surface 112 of the mandrel 104 during movement of the sweep arm 510. Generally, the sweep arms 510 are configured to engage (e.g., grab and pull) the wrap ply 102 to a desired tautness, sufficient to wrap the wrap ply 102 over the bottom surface 112 of the mandrel 104. The sweep arms 510 are also configured not to re-engage the wrap ply 102, when retracted, to prevent the sweep arm 510 from pulling the wrap ply 102 off of the mandrel 104.

As illustrated in FIGS. 6A and 6B, in an example, the wrap ply 102 is placed so that the first end portion 130 covers a portion (e.g., approximately half) of the bottom surface 112 of the mandrel 104 and the second end portion 132 covers a remaining portion (e.g., approximately the other half) of the bottom surface 112 of the mandrel 104 and opposing ends of the wrap ply abut each other. Alternatively, in another example, the wrap ply 102 is placed so that at least a portion of the first end portion 130 and a portion of the second end portion 132 overlap, for example, so that the first end portion 130 covers more than half or all of the bottom surface 112 of the mandrel 104 and the second end portion 132 covers more than half or all of the bottom surface 112 of the mandrel 104 over top of the first end portion 130.

Figure 7:
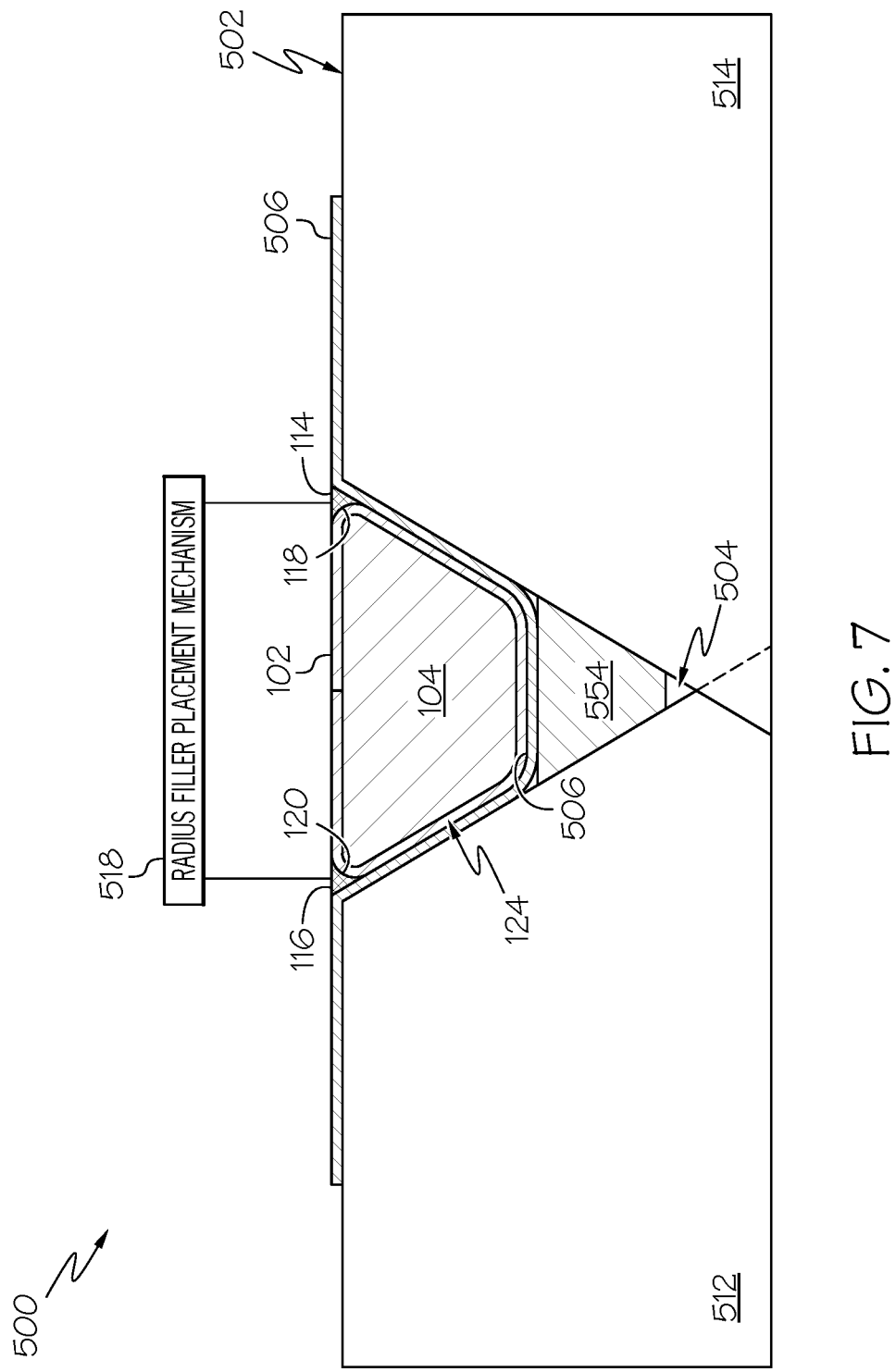
FIG. 7 is a schematic illustration of an example of the apparatus depicting an example of a bladder mandrel layup of the bladder mandrel package of FIG. 2 prior to consolidation.
Figure 8:
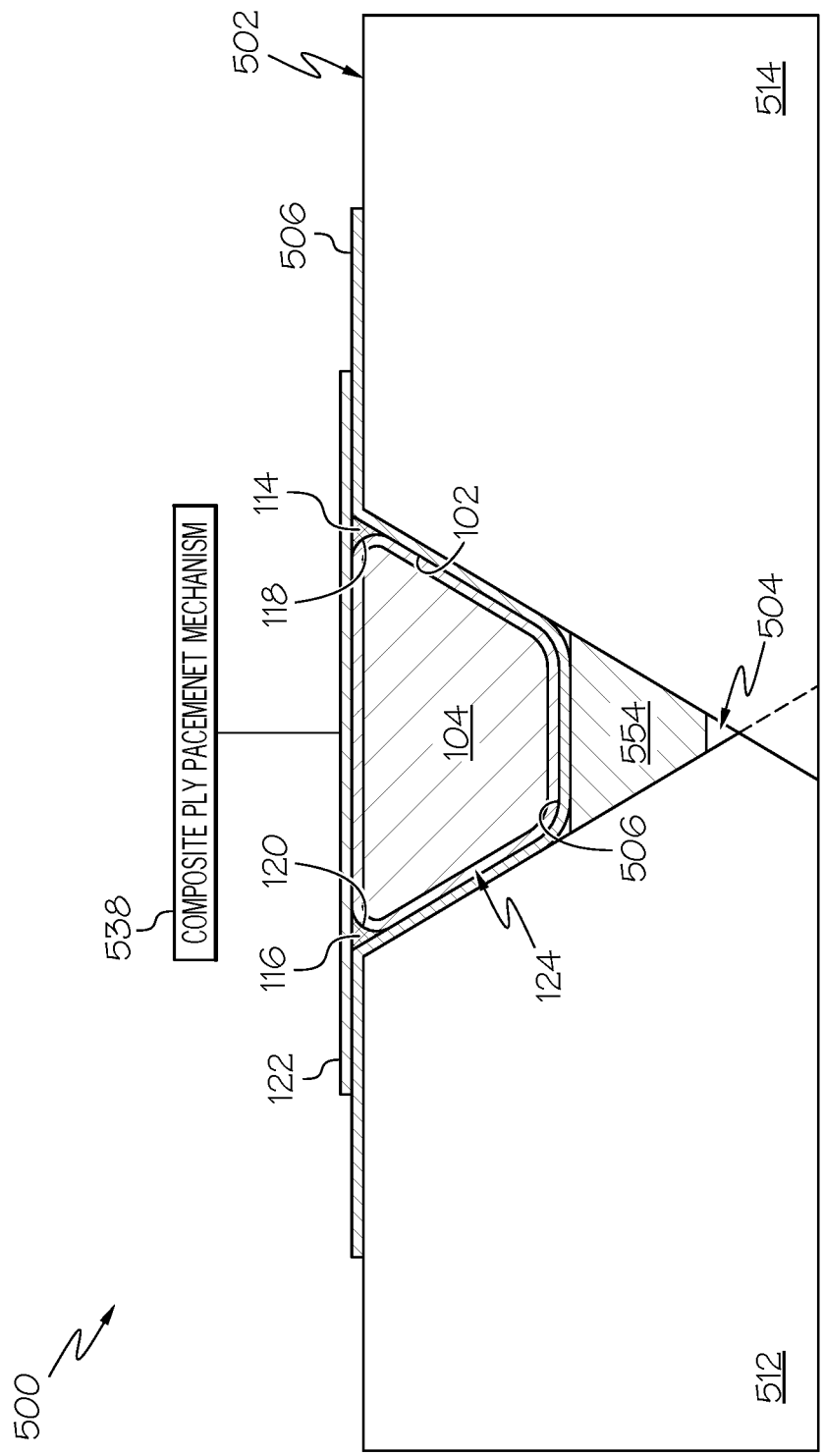
FIG. 8 is a schematic illustration of an example of the apparatus depicting an example of a bladder mandrel layup of the bladder mandrel package of FIG. 3 prior to consolidation.

As illustrated in FIGS. 1 and 7, in an example, the apparatus 500 includes a radius filler placement mechanism 518. The radius filler placement mechanism 518 is movable relative to the die tool 502. The radius filler placement mechanism 518 is configured to place the first radius filler 114 of the bladder mandrel package 100 at, or along, the first radius 118 of the wrapped mandrel 124 and to place the second radius filler 116 of the bladder mandrel package 100 at, or along, the second radius 120 of the wrapped mandrel 124. In an example, placement of the first radius filler 114 and the second radius filler 116 is automated. In another example, placement of the first radius filler 114 and the second radius filler 116 is performed manually. FIGS. 7 and 8 depict the first radius filler 114 and the second radius filler 116 in place; following placement of the first radius filler 114 and the second radius filler 116 by the radius filler placement mechanism 518.

In an example, the radius filler placement mechanism 518 includes, or takes the form of, a robot with an extrusion dispenser. The extrusion dispenser is configured to dispense a composite material to form, or place, the first radius filler 114 and the second radius filler 116 along the first radius 118 and the second radius 120, respectively. In other examples, a different type of device capable of placing the first radius filler 114 and the second radius filler 116 may be used and other types or configurations of the first radius filler 114 and the second radius filler 116 are contemplated, besides extrusion.

As illustrated in FIGS. 1 and 8, in an example, the apparatus 500 includes a composite ply placement mechanism 538. The composite ply placement mechanism 538 is movable relative to the die tool 502. The composite ply placement mechanism 538 is configured to place the inner mold line ply 122 of the bladder mandrel package 100 on the first radius filler 114, the second radius filler 116, and the wrapped mandrel 124. In an example, placement of the inner mold line ply 122 is automated. In another example, placement of the inner mold line ply 122 is performed manually. FIG. 8 depicts the inner mold line ply 122 in place; following placement of the inner mold line ply 122 by the composite ply placement mechanism 538.

In an example, the composite ply placement mechanism 538 includes, or takes the form of, a composite ply pick and place device. In another example, the composite ply placement mechanism 538 includes, or takes the form of, a net trim laminator. In other examples, a different type of device capable of placing the inner mold line ply 122 may be used.

Figure 9:
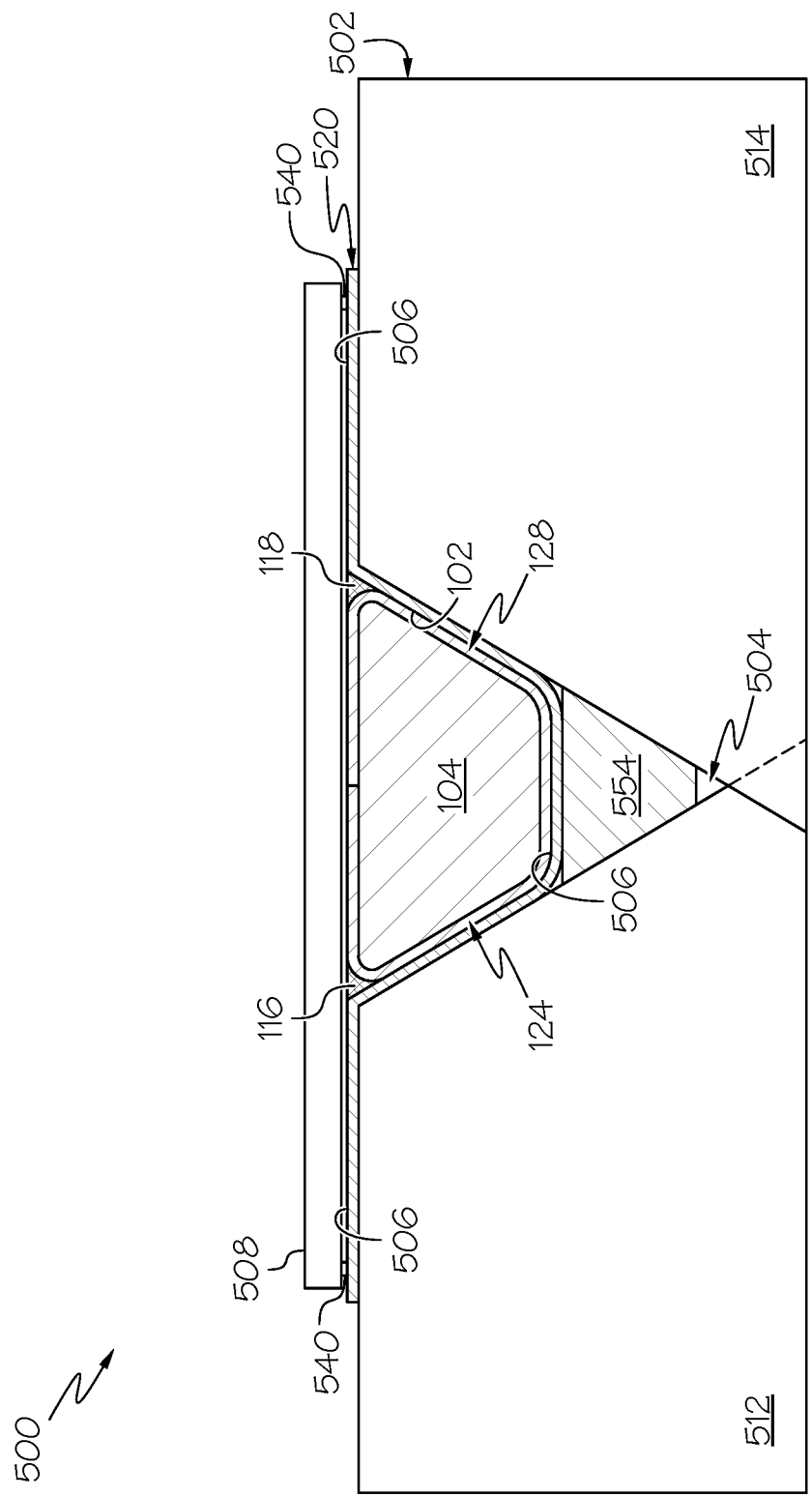
FIG. 9 is a schematic illustration of an example of the apparatus depicting an example of the bladder mandrel package of FIG. 2 during consolidation.
Figure 10:
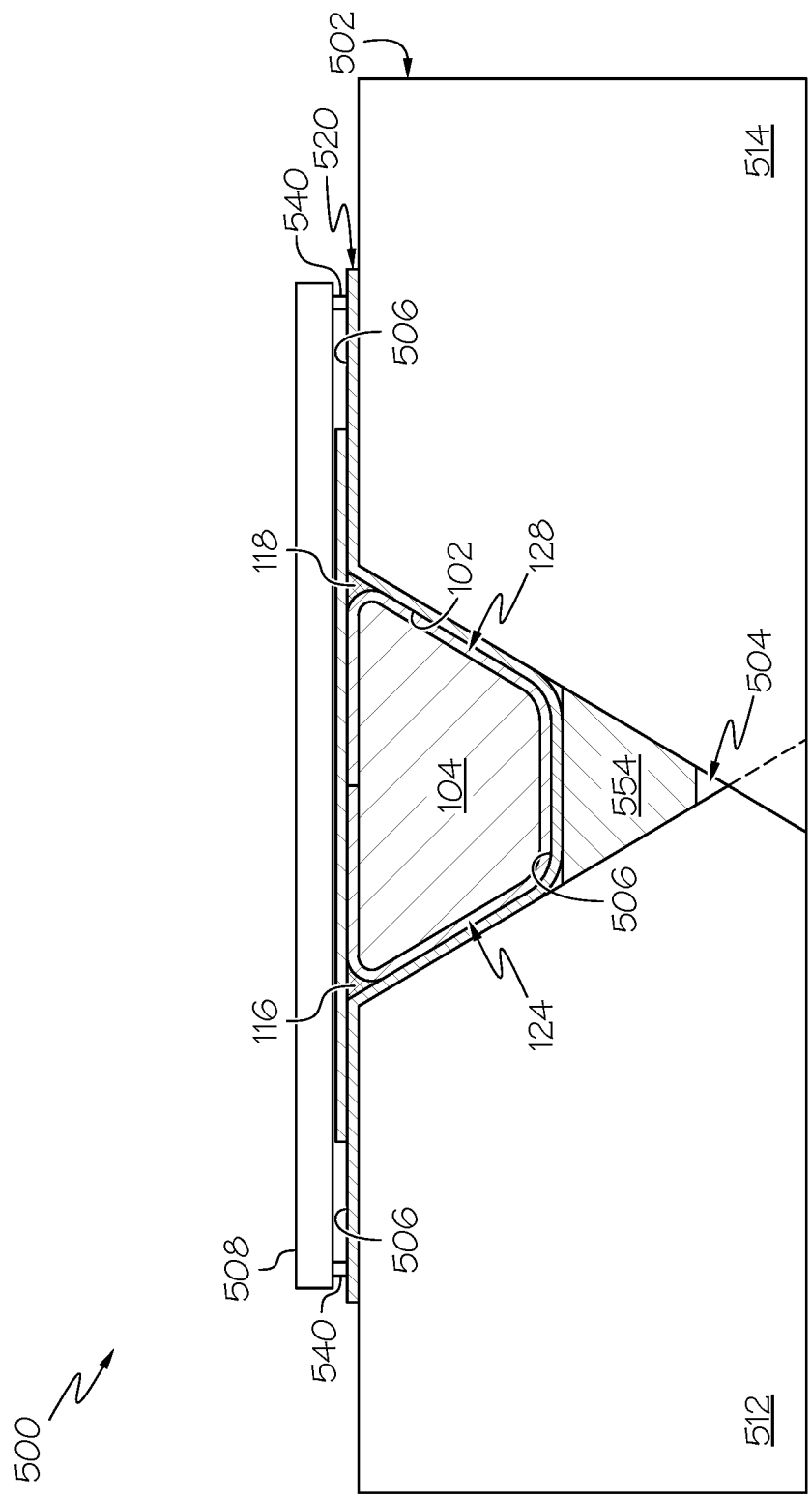
FIG. 10 is a schematic illustration of an example of the apparatus depicting an example of the bladder mandrel package of FIG. 3 during consolidation.

As illustrated in FIGS. 1, 9, and 10, in an example, the apparatus 500 includes a consolidating mechanism 520. As illustrated in FIG. 9, in an example, the consolidating mechanism 520 is configured to consolidate, or compact, the first radius filler 114, the second radius filler 116, and the wrap ply 102 to, or against, the mandrel 104 to form the bladder mandrel package 100. As illustrated in FIG. 10, in another example, the consolidating mechanism 520 is configured to consolidate the inner mold line ply 122, the first radius filler 114, the second radius filler 116, and the wrap ply 102 to, or against, the mandrel 104 to form the bladder mandrel package 100.

As illustrated in FIGS. 9 and 10, in an example, the consolidating mechanism 520 is configured to apply vacuum pressure to a bladder mandrel layup 128, formed by the mandrel 104, the wrap ply 102, the first radius filler 114, the second radius filler 116, and, optionally, the inner mold line ply 122, when present, to form the bladder mandrel package 100. In an example, the consolidating mechanism 520 includes the vacuum bagging film 506 and the backing plate 508. In an example, the vacuum bagging film 506 is a thin, flexible rubber vacuum bag. In an example, the backing plate 508 is a rigid base plate that is sealed (e.g., via number of seals 540) to the vacuum bagging film 506. In an example, the backing plate 508 serves as a compacting surface during application of vacuum pressure for consolidation of the bladder mandrel layup 128 to form the bladder mandrel package 100.

As illustrated in FIG. 9, in an example, the vacuum bagging film 506 is positioned between the bladder mandrel layup 128, including, or formed by, the mandrel 104, the wrap ply 102, the first radius filler 114, and the second radius filler 116, and the die tool 502. The bladder mandrel layup 128 is positioned between the backing plate 508 and the vacuum bagging film 506. The backing plate 508 is then sealed to the vacuum bagging film 506. The vacuum is then applied to consolidate the bladder mandrel layup 128 and form the bladder mandrel package 100.

Optionally, in an example, an additionally ply or layer of material (not illustrated) may be placed over the wrap ply 102 prior to placement of the backing plate 508 and application of the vacuum pressure. In such an example, the additionally ply or layer of material may assist in removal of the bladder mandrel package 100 from the backing plate 508 after consolidation.

As illustrated in FIG. 10, in another example, the vacuum bagging film 506 is positioned between the bladder mandrel layup 128, including, or formed by, the mandrel 104, the wrap ply 102, the first radius filler 114, the second radius filler 116, and the inner mold line ply 122, and the die tool 502. The bladder mandrel layup 128 is positioned between the backing plate 508 and the vacuum bagging film 506. The backing plate 508 is then sealed to the vacuum bagging film 506. The vacuum is then applied to consolidate the bladder mandrel layup 128 and form the bladder mandrel package 100.

As illustrated in FIG. 4, in an example, the vacuum bagging film 506 is placed over the cavity 504 of the die tool 502 prior to placing the wrap ply 102. The wrap ply 102 is placed onto, or over, the vacuum bagging film 506 and the mandrel 104 is placed onto, or over, the wrap ply 102. As illustrated in FIG. 5, in an example, the vacuum bagging film 506, the wrap ply 102, and the mandrel 104 are pressed, for example, by the pressing tool 516, into the cavity 504. When the vacuum bagging film 506, the wrap ply 102, and the mandrel 104 are pressed into the cavity 504, a portion of the vacuum bagging film 506 is sandwiched between the wrap ply 102 and the first tooling surface 528 and another portion of the vacuum bagging film 506 is sandwiched between the wrap ply 102 and the second tooling surface 530. Further, when the vacuum bagging film 506, the wrap ply 102, and the mandrel 104 are pressed into the cavity 504, a portion of the vacuum bagging film 506 is sandwiched between the wrap ply 102 and the third tooling surface 556 of the wedge 554, when present.

Thus, in an example, the vacuum bagging film 506 is located between the die tool 502 and the wrapped mandrel 124, the first radius filler 114, and the second radius filler 116 and extends beyond a perimeter of the bladder mandrel layup 128, as illustrated in FIG. 9. In another example, the vacuum bagging film 506 is located between the die tool 502 and the wrapped mandrel 124, the first radius filler 114, the second radius filler 116, and the inner mold line ply 122 and extends beyond the perimeter of the bladder mandrel layup 128, as illustrated in FIG. 10.

The backing plate 508 is movable relative to the die tool 502 and is configured to be sealed to the vacuum bagging film 506 for application of vacuum pressure to consolidate the bladder mandrel layup 128 and form the bladder mandrel package 100. Atmospheric pressure helps to hold the bladder mandrel layup 128 against the backing plate 508 as the pressure within the sealed vacuum chamber formed by the backing plate 508 and the vacuum bagging film 506 is reduced significantly below the atmospheric pressure resulting in a compression force.

As illustrated in FIG. 9, in an example, the backing plate 508 is positioned, or placed, over a bottom end of the bladder mandrel layup 128 (e.g., the first radius filler 114, the second radius filler 116, and the wrapped mandrel 124) so that the backing plate 508 and the vacuum bagging film 506 are sealed beyond the perimeter of the bladder mandrel layup 128. When the backing plate 508 and the vacuum bagging film 506 are sealed together, vacuum pressure is applied to the bladder mandrel layup 128 (e.g., the first radius filler 114, the second radius filler 116, the wrap ply 102, and the mandrel 104) to form the consolidated, or compacted, bladder mandrel package 100.

As illustrated in FIG. 10, in another example, the backing plate 508 is positioned, or placed, over the bottom end of the bladder mandrel layup 128 (e.g., the inner mold line ply 122, the first radius filler 114, the second radius filler 116, and the wrapped mandrel 124) so that the backing plate 508 and the vacuum bagging film 506 are sealed beyond a perimeter of the bladder mandrel layup 128. When the backing plate 508 and the vacuum bagging film 506 are sealed together (e.g., via the number of seals 540), vacuum pressure is applied to the bladder mandrel layup 128 (e.g., the inner mold line ply 122, the first radius filler 114, the second radius filler 116, the wrap ply 102, and the mandrel 104) to form the consolidated, or compacted, bladder mandrel package 100.

In an example, the vacuum bagging film 506 and the backing plate 508 define, or form a sealed vacuum chamber. The bladder mandrel layup 128 is sealed within the vacuum chamber. The vacuum pressure is applied through the backing plate 508 to the vacuum chamber defined by the vacuum bagging film 506 and the backing plate 508.

As illustrated in FIGS. 9 and 10, in an example, the consolidating mechanism 520 includes the number of seals 540. In an example, the number of seals 540 is coupled (e.g., fixed) to an inner surface of the backing plate 508 and is configured for sealable engagement with the vacuum bagging film 506. In an example, the number of seals 540 includes, or takes the form of, a flexible lip seal.

FIGS. 9 and 10 depict the backing plate 508 sealed to the vacuum bagging film 506, but prior to application of the vacuum pressure. It should be appreciated that during application of the vacuum pressure, the bladder mandrel layup 128 and the vacuum bagging film 506 are drawn, or pulled, toward and into contact with the inner surface of the backing plate 508. The vacuum pressure compresses the bladder mandrel layup 128 between the vacuum bagging film 506 and the backing plate 508 to consolidate the components of the bladder mandrel layup 128 and form the compacted bladder mandrel package 100.

In an example, following consolidation, the backing plate 508 also helps transport the consolidated, but not yet cured, bladder mandrel package 100. In an example, following consolidation, the bladder mandrel package 100 is only tacked together and is somewhat fragile, as it is only held together by tacking between the components of the bladder mandrel package 100. In an example, following consolidation, it is contemplated that the vacuum bagging film 506 and the backing plate 508 remained sealed vie the number of seals 540 so that the vacuum chamber is maintained in a vacuum during transport of the bladder mandrel package 100 to maintain consolidation.

In an example, following consolidation, the bladder mandrel package 100 is coupled to the backing plate 508. For example, the bladder mandrel package 100 is temporarily coupled to the backing plate 508. In an example, due to the vacuum pressure compacting the bladder mandrel package 100 against the inner surface of the backing plate 508 during consolidation, the bladder mandrel package 100 is secured in place on the backing plate 508 by the inherent tackiness of the composite materials forming the consolidated, but not yet cured, components of the bladder mandrel package 100. In another example, the bladder mandrel package 100 is secured in place on the backing plate 508 by applying, or using, an active vacuum through the backing plate 508.

In an example, following consolidation and with the bladder mandrel package 100 coupled to the backing plate 508, the bladder mandrel package 100 is removed from the die tool 502. Following consolidation and with the bladder mandrel package 100 removed from the die tool 502, the bladder mandrel package 100 is ready for use to form the composite structure 200.

Figure 11:
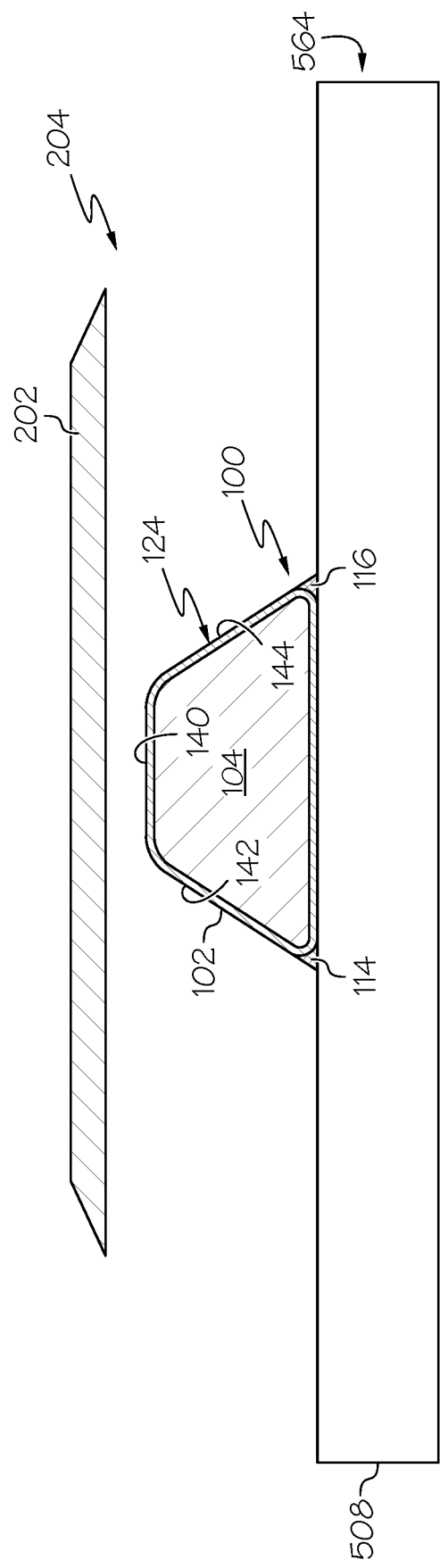
FIG. 11 is a schematic illustration of an example of a composite stringer layup using the bladder mandrel package of FIG. 2 prior to consolidation.
Figure 12:
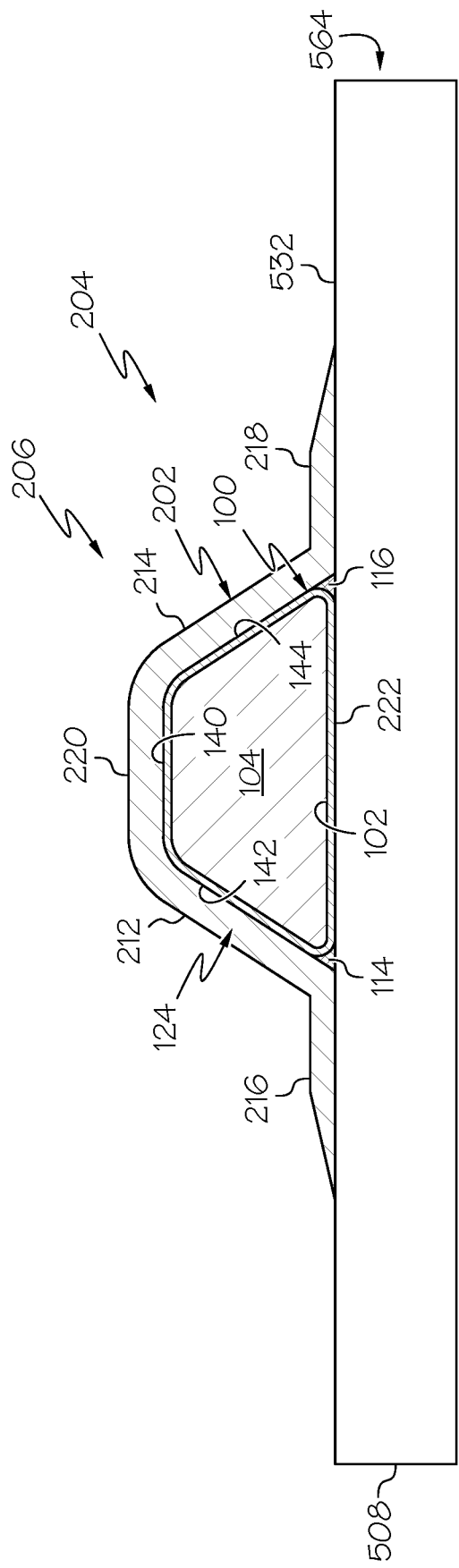
FIG. 12 is a schematic illustration of an example of the compacted stringer package using the bladder mandrel package of FIG. 2.
Figure 13:
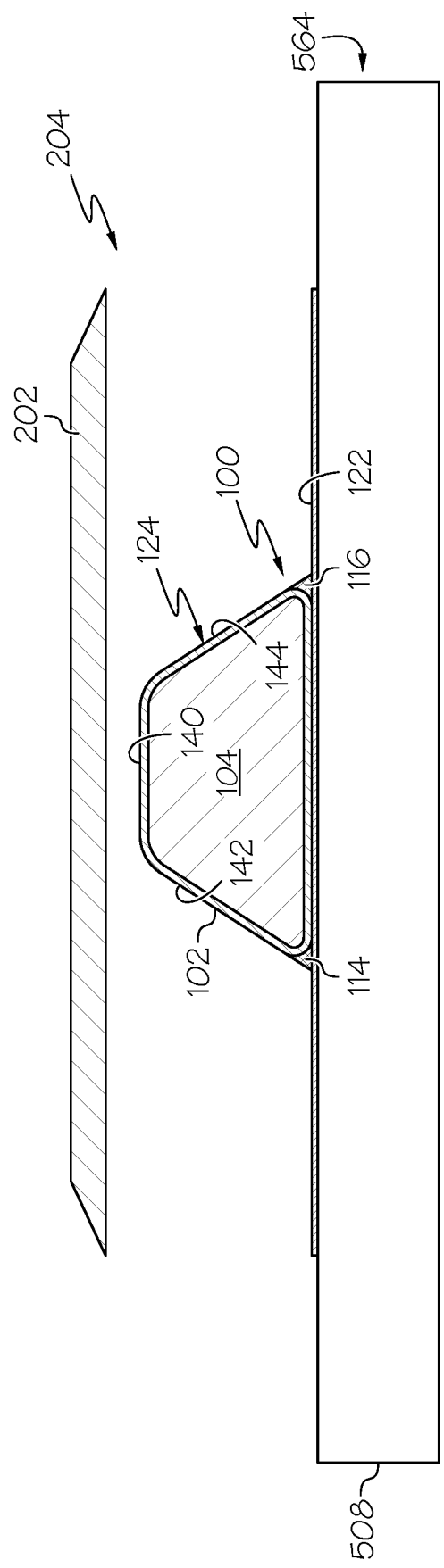
FIG. 13 is a schematic illustration of an example of the composite stringer layup using the bladder mandrel package of FIG. 3 prior to consolidation.
Figure 14:
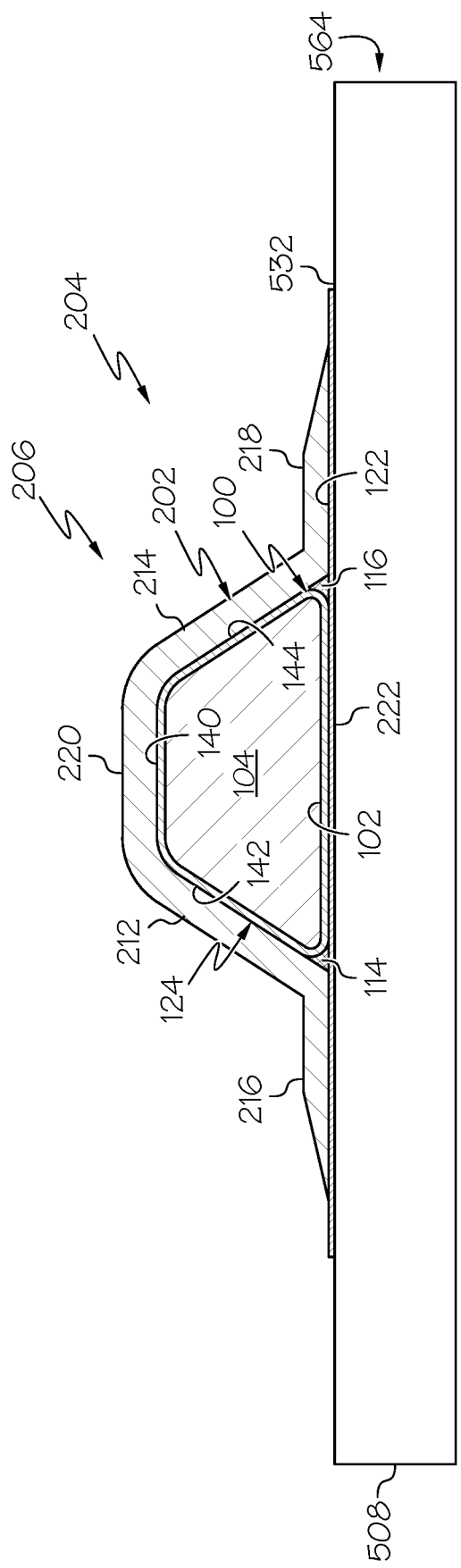
FIG. 14 is a schematic illustration of an example of the compacted stringer package using the bladder mandrel package of FIG. 3.
Figure 15:
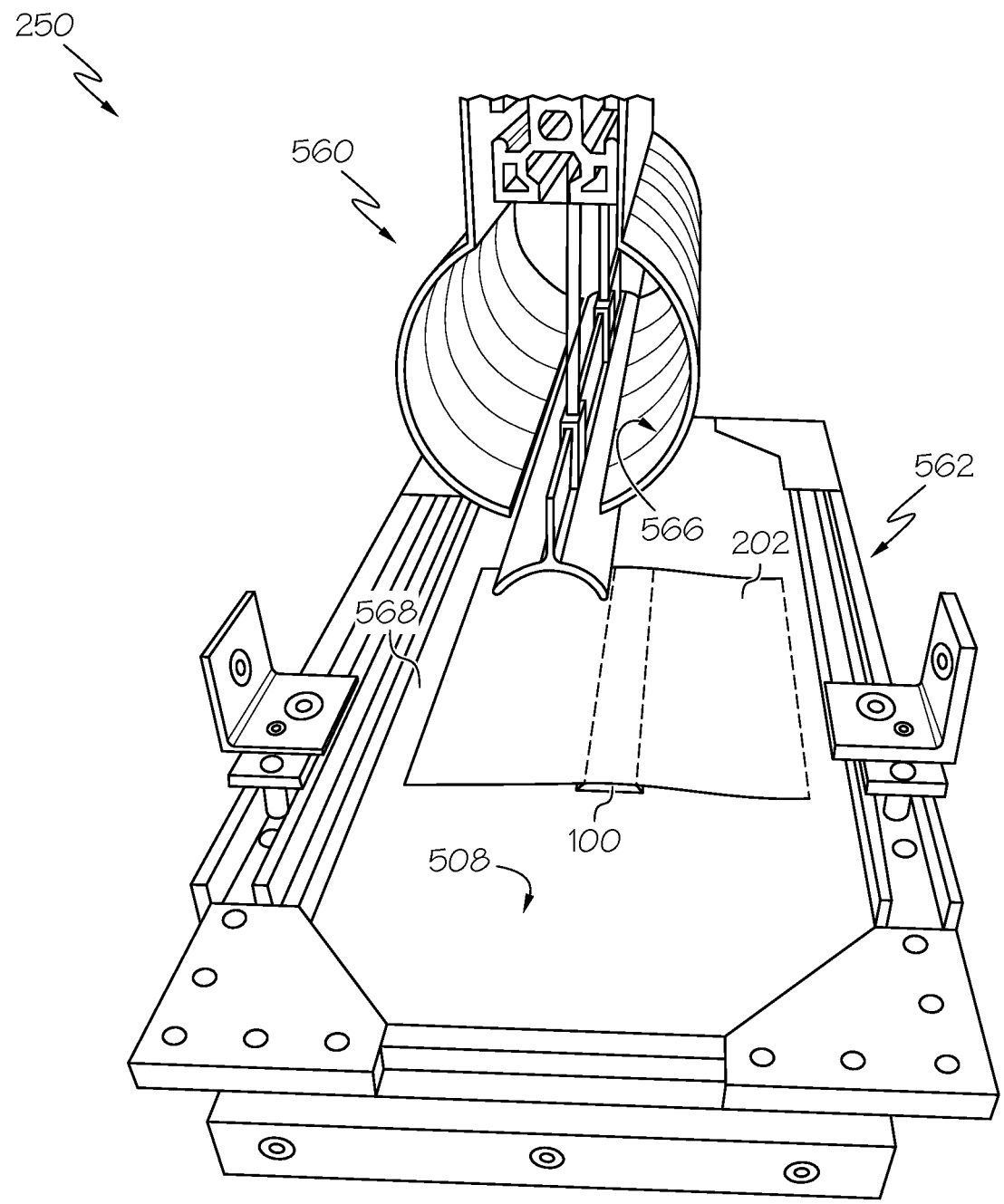
FIG. 15 is a schematic illustration of an example of a mechanical shaping tool and an example of vacuum forming equipment prior to consolidation.
Figure 16:
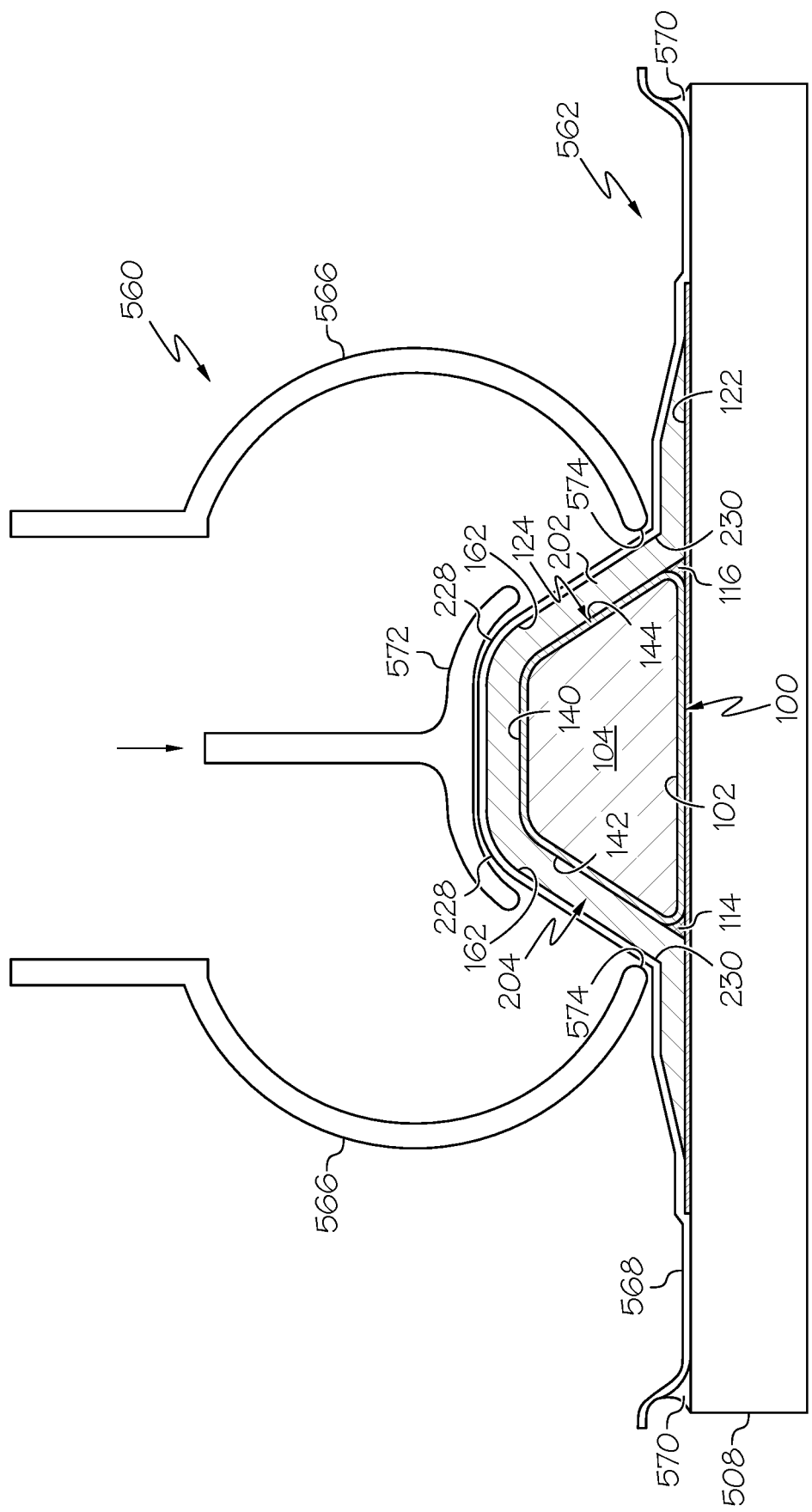
FIG. 16 is a schematic illustration of an example of the mechanical shaping tool and an example of the vacuum forming equipment during consolidation.
Figure 17:
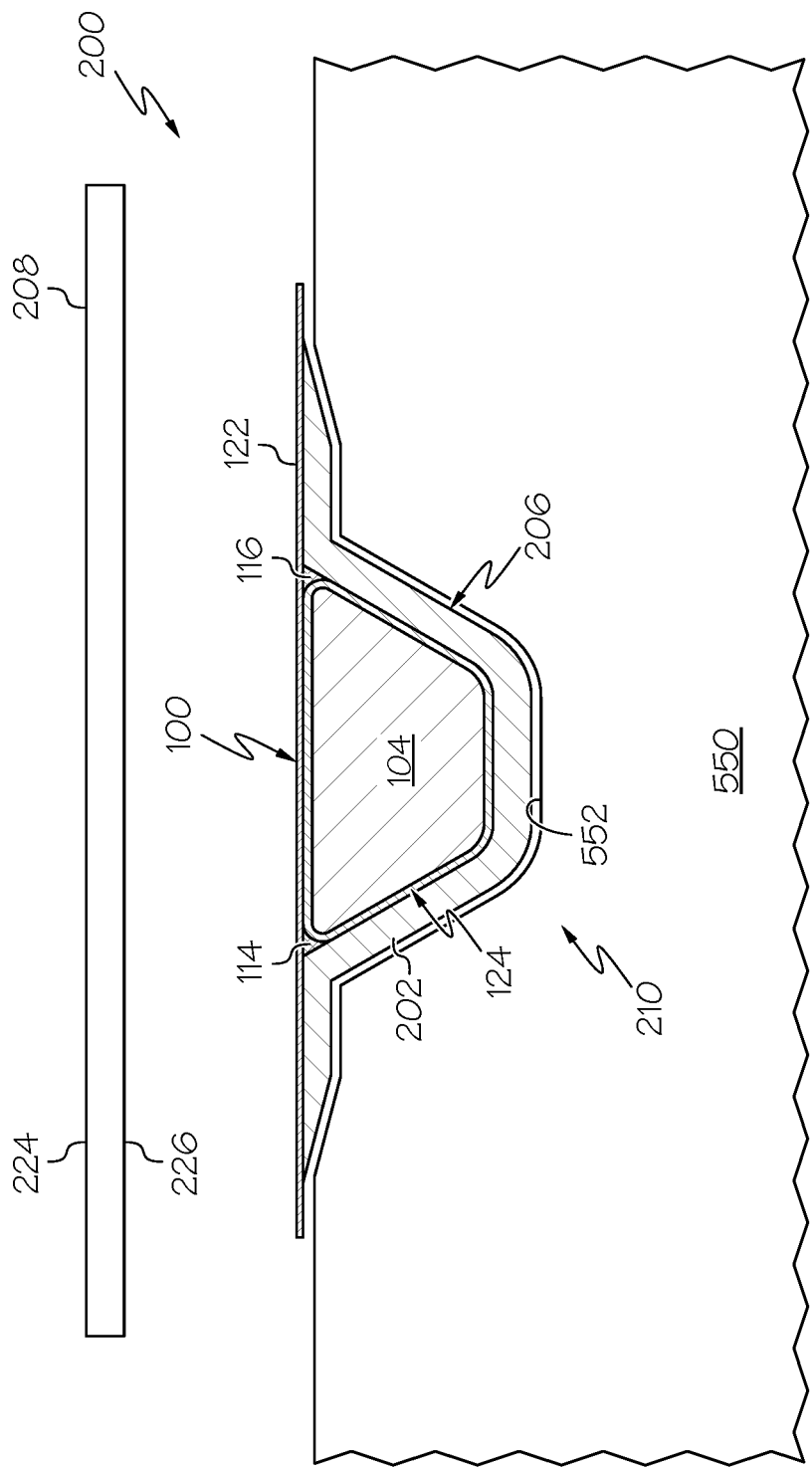
FIG. 17 is a schematic illustration of an example of a cure tool depicting an example of the compacted stringer package.

Referring generally to FIGS. 1 and 11-17, in an example, the composite structure 200 includes a composite stringer 210 (FIG. 1). In such an example, the bladder mandrel package 100 is used to form a compacted stringer package 206. The compacted stringer package 206 is then cured to form the composite stringer 210. FIGS. 11-16 depict the bladder mandrel package 100 and the backing plate 508 in a flipped orientation, or rotated 180 degrees, as compared to the orientation of the bladder mandrel package 100 shown in FIGS. 4-10. In other words, the bladder mandrel package 100 and the backing plate 508 depicted in FIGS. 11-17 are examples of the bladder mandrel package 100 and the backing plate 508 depicted in FIGS. 2 and 3. FIGS. 11 and 13 depict components of a stringer layup 204 not yet compacted or consolidated (i.e., consolidation pressure has not yet been applied). FIGS. 12 and 14 depict the compacted stringer package 206 as a compacted structure formed of the components shown in FIGS. 11 and 13, respectively. FIGS. 15 and 16 depict an example technique of compacting the stringer layup 204 to form the compacted stringer package 206, as part of forming a stringer preform. FIG. 17 depicts an example technique of curing the compacted stringer package 206 to form the composite stringer 210.

Referring to FIGS. 11-16, in an example, the compacted stringer package 206 includes a composite charge 202 and the bladder mandrel package 100. As illustrated in FIGS. 11 and 13, the composite charge 202 is placed over the bladder mandrel package 100 to form the stringer layup 204. A shaping pressure, or force, is applied to the composite charge 202 to shape the composite charge 202 over the bladder mandrel package 100 and a compaction pressure, or force, is applied to the stringer layup 204 to form the compacted stringer package 206. As will be described in greater detail herein below, in one or more examples, a vacuum bag 568 (FIGS. 15 and 16) is formed over the stringer layup 204 and is sealed to the backing plate 508 beyond a perimeter of the stringer layup 204 or the stringer layup 204 is placed into an autoclave at higher pressure or both the vacuum bag 568 and the pressurized autoclave are used to form the compacted stringer package 206.

As illustrated in FIGS. 12 and 14, in an example, when the composite charge 202 is formed over the bladder mandrel package 100 and the backing plate 508, the composite charge 202 further encloses the first radius filler 114 and the second radius filler 116 in the stringer preform by forming a third, and final, side of a radius filler (e.g., noodle) cavity. As illustrated, a first side of the radius filler cavity is formed by the wrapped mandrel 124 and a second side of the radius filler cavity is formed by the backing plate 508 (e.g., FIG. 12) or the inner mold line ply 122, when present (e.g., FIG. 14).

In an example, the composite charge 202 includes, or is formed of, a number of plies, or sheets, of a composite material. Each ply of the composite material includes reinforcing fibers bound in a polymer resin matrix. Resins used in the composite material may include thermoplastic or thermoset resins. The fibers may be unidirectional or may take the form of a woven cloth or fabric. The fibers of the composite material of different plies of the composite charge 202 may have the same fiber orientation or different orientations. Generally, the polymer resin matrix of the composite charge 202 is compatible with the polymer resin material of the first radius filler 114 and the second radius filler 116, the polymer resin matrix of the wrap ply 102, and the polymer resin matrix of the inner mold line ply 122, when present.

In an example, the fibers of the composite material of the composite charge 202, the fibers of the composite material of the wrap ply 102, and the fibers of the composite material of the inner mold line ply 122 have the same fiber orientation. In another example, one or more of the fibers of the composite material of the composite charge 202, the fibers of the composite material of the wrap ply 102, and the fibers of the composite material of the inner mold line ply 122 have different fiber orientations.

As illustrated in FIGS. 11-14, in an example, one or both of the opposing sides of the composite charge 202 have a tapered edge portion, such that ends of the composite charge 202 form a scarf. In such an example, the scarf end may be formed by ply drop offs of the number of plies of composite material forming the composite charge 202.

Generally, in one or more examples, the stringer layup 204 is formed on a rigid base 564. As illustrated in FIGS. 11-14, in an example, the rigid base 564 is the backing plate 508 used during formation of the bladder mandrel package 100. In other words, the stringer layup 204 is formed on the backing plate 508 on which the bladder mandrel package 100 was formed and to which the bladder mandrel package 100 is coupled. This configuration beneficially enables the bladder mandrel package 100 to be transported, as a consolidated whole, from a first location in the manufacturing environment 250, where the bladder mandrel package 100 was formed, to a second location in the manufacturing environment 250, where the stringer layup 204 is to be formed.

As illustrated in FIG. 12, in an example, when shaping the composite charge 202, the composite charge 202 contacts the wrap ply 102, the first radius filler 114, the second radius filler 116, and the backing plate 508. As illustrated in FIG. 14, in another example, when shaping the composite charge 202, the composite charge 202 contacts the wrap ply 102, the first radius filler 114, the second radius filler 116, and the inner mold line ply 122.

In an example, after placing the composite charge 202 over the bladder mandrel package 100, pressure is applied to the stringer layup 204 to shape the composite charge 202 to the bladder mandrel package 100 and the backing plate 508 (e.g., the rigid base 564). Such shaping pressure is configured to form the compacted stringer package 206 having a cross-sectional shape complementing the cross-sectional shape of the bladder mandrel package 100 and the backing plate 508. The pressure applied to the composite charge 202 and the bladder mandrel package 100 may be mechanical pressure, vacuum pressure, or a combination of mechanical pressure and vacuum pressure.

As illustrated in FIGS. 1, 15, and 16, in an example, the mechanical pressure is applied using a mechanical shaping tool 560. The mechanical shaping tool 560 may take any desirable configuration. In an example, the mechanical shaping tool 560 includes a plurality of mechanical fingers 566. Applying the mechanical pressure includes pressing the composite charge 202 onto the bladder mandrel package 100 using the mechanical fingers 566 by sliding mechanical fingers 566 across, or over, the composite charge 202 on the bladder mandrel package 100 and backing plate 508.

As illustrated in FIGS. 1, 15, and 16, in an example, the vacuum pressure is supplied using vacuum forming equipment 562. The vacuum forming equipment 562 may take any desirable configuration. In an example, the vacuum forming equipment 562 includes at least one of the vacuum bag 568, a number of seals 570, tubing, and a vacuum source. Applying the vacuum pressure compresses the stringer layup 204 against the backing plate 508 using the vacuum bag 568.

The mechanical fingers 566 may have any desirable shape and may be actuated by any desirable force. As illustrated in FIG. 16, the composite charge 202 and the bladder mandrel package 100 are present between backing plate 508 (e.g., rigid base 564) and the vacuum bag 568. The bladder mandrel package 100 is present to shape the composite charge 202 on the backing plate 508. In an example, shaping the composite charge 202 with the mechanical fingers 566, especially at inflection points 228 and inflection points 230 (FIG. 16), ensures there is no bridging of plies, especially across the inflection points 228 and inflection points 230. In other words, sliding the fingertips 574 of the mechanical fingers 566 over the composite charge 202, when shaping the composite charge 202 over bladder mandrel package 100, avoids bridging of plies between composite layers between the composite charge 202 and the bladder mandrel package 100. The mechanical fingers 566 avoid such bridging of plies by smoothing down the composite charge 202 to form a first web 212 and a second web 214 of the compacted stringer package 206 (FIGS. 12 and 14) into the inflection points 228 the inflection points 230.

FIG. 16 illustrates an example of the mechanical shaping tool 560 while compacting the stringer layup 204. In the illustrative example, the stringer layup 204 includes the composite charge 202 and the bladder mandrel package 100 that includes the wrapped mandrel 124 (i.e., the mandrel 104 surrounded by the wrap ply 102), the first radius filler 114, the second radius filler 116, and the inner mold line ply 122. Although the inner mold line ply 122 is present in the example of the stringer layup 204 illustrated in FIG. 16, the inner mold line ply 122 is optional.

In an example, the mechanical shaping tool 560 applies the mechanical pressure to shape the composite charge 202 and form the stringer layup 204 and, then, the vacuum forming equipment 562 applies the vacuum pressure to compact the stringer layup 204 and form the compacted stringer package 206. In another example, the mechanical pressure and the vacuum pressure are applied substantially simultaneously. In an example, the vacuum pressure may remain on the stringer layup 204 longer than the mechanical pressure. As illustrated in FIG. 16, in an example, the plurality of mechanical fingers 566 slide across the composite charge 202 on the bladder mandrel package 100 and the backing plate 508. The mechanical fingers 566 apply the mechanical pressure to the composite charge 202 to shape and compact the composite charge 202. In an example, the vacuum pressure is applied to the stringer layup 204 under the vacuum bag 568.

FIG. 16 depicts the mechanical shaping tool 560 a portion of the way through the operation of shaping the composite charge 202 over the bladder mandrel package 100. In an example of the shaping and compacting operation, initially, the composite charge 202 is placed over the bladder mandrel package 100 and the backing plate 508. The vacuum bag 568 is then placed over the composite charge 202.

In an example, a cap-forming portion 572 of the mechanical shaping tool 560 is then brought into contact with the vacuum bag 568 and an applies mechanical pressure to push a portion of the vacuum bag 568 and a portion of the composite charge 202 against a top surface 140 of the bladder mandrel package 100. In other words, a portion of the composite charge 202 is sandwiched between the vacuum bag 568 and the bladder mandrel package 100. This portion of the shaping operation partially shapes the vacuum bag 568 and the composite charge 202 over the top surface 140 of the bladder mandrel package 100 to shape what will be a cap 220 of the compacted stringer package 206 (FIGS. 12 and 14).

In an example, the fingertips 574 of the mechanical fingers 566 are then brought into contact with the vacuum bag 568, proximate a top portion of the bladder mandrel package 100, such as proximate to opposing inflection points 162 of the bladder mandrel package 100, between the top surface 140 and a first side surface 142 and between the top surface 140 and a second side surface 144, respectively, of the bladder mandrel package 100. This portion of the shaping operation partially shapes the vacuum bag 568 and the composite charge 202 over portions of the first side surface 142 and the second side surface 144 of the bladder mandrel package 100 to shape what will be inflection points 228 (FIG. 16) between the cap 220 and a first web 212 and a second web 214 of the compacted stringer package 206 (FIGS. 12 and 14).

In an example, the fingertips 574 of the mechanical fingers 566 then slide downward and outward along the first side surface 142 and the second side surface 144 of the bladder mandrel package 100 and applies mechanical pressure to push a portion of the vacuum bag 568 and a portion of the composite charge 202 against respective one of the first side surface 142 and the second side surface 144 of the bladder mandrel package 100. In other words, a portion of the composite charge 202 is sandwiched between the vacuum bag 568 and the first side surface 142 and the second side surface 144 of the bladder mandrel package 100. This portion of the shaping operation further shapes the vacuum bag 568 and the composite charge 202 over the first side surface 142 and the second side surface 144 to shape what will be the first web 212 and the second web 214 of the compacted stringer package 206 (FIGS. 12 and 14).

In an example, the fingertips 574 of the mechanical fingers 566 continue to slide downward to the first radius filler 114 and the second radius filler 116 of the bladder mandrel package 100 and applies mechanical pressure to push a portion of the vacuum bag 568 and a portion of the composite charge 202 against respective one of the first radius filler 114 and the second radius filler 116. In other words, a portion of the composite charge 202 is sandwiched between the vacuum bag 568 and the first radius filler 114 and the second radius filler 116 of the bladder mandrel package 100. This portion of the shaping operation further shapes the vacuum bag 568 and the composite charge 202 over the first radius filler 114 and the second radius filler 116 to shape what will be inflection points 230 (FIG. 16) between the first web 212 and a first flange 216 and between the second web 214 and a second flange 218 of the compacted stringer package 206 (FIGS. 12 and 14).

In an example, vacuum pressure is then applied to the stringer layup 204 between the sealed (e.g., via the number of seals 570) vacuum bag 568 and the backing plate 508 to push a portion of the vacuum bag 568 and a portion of the composite charge 202 against the backing plate 508. In other words, a portion of the composite charge 202 is sandwiched between the vacuum bag 568 and the backing plate 508 or a portion of the composite charge 202 is sandwiched between the vacuum bag 568 and the inner mold line ply 122, when present, as illustrated in FIG. 16. This portion of the shaping operation further shapes the the composite charge 202 over the backing plate 508 to shape what will be the first flange 216 and the second flange 218 of the compacted stringer package 206 (FIGS. 12 and 14).

The operation described above enables the stringer layup 204 (or stringer preform) to be shaped over the bladder mandrel package 100 and the backing plate 508, while smoothing out any wrinkles and preventing bridging of plies at inflection points 228 and inflection points 230 (FIG. 16). This operation also enables proper placement of the vacuum bag 568, while smoothing out any wrinkles in the vacuum bag 568, when shaping the composite charge 202.

The illustrations of the mechanical shaping tool 560 and the vacuum forming equipment 562 in FIGS. 15 and 16 are not meant to imply physical or architectural limitations to the manner in which any example may be implemented. In an example, the mechanical shaping tool 560 may have any desirable number and shape of mechanical fingers 566. In an example, the cap-forming portion 572 of the mechanical shaping tool 560 may have a different shape. In an example, the mechanical shaping tool 560 may include a diaphragm or inflatable bladder to apply the mechanical pressure to the stringer layup 204. In an example, the mechanical shaping tool 560 and, more particularly, the mechanical finger 566 may be configured to apply mechanical pressure to push a portion of the vacuum bag 568 and a portion of the composite charge 202 against the backing plate 508. In an example, the vacuum forming equipment 562 may include any one of various different vacuum-forming devices.

In some examples, one or more components of a resulting compacted stringer package 206, such as the composite charge 202, are ambient temperature while at least one of the mechanical pressure and the vacuum pressure is applied. In other examples, the composite charge 202 or another component of the compacted stringer package 206 may be heated while at least one of the mechanical pressure or the vacuum pressure is applied.

Generally, the compacted stringer package 206 has a cross-sectional shape defined by the cross-sectional shape of the bladder mandrel package 100 and a portion of the backing plate 508. As illustrated in FIGS. 12 and 14, in an example, the compacted stringer package 206 has a partially closed cross-sectional shape, such as a hat-shaped cross-section. In such an example, the compacted stringer package 206 includes a first web 212, a second web 214, a cap 220, a first flange 216, and a second flange 218. The cap 220 is connected to and extends between the first web 212 and the second web 214. The first web 212 and second web 214 are on opposite sides of the cap 220. The first flange 216 is connected to and extends from the first web 212. The second flange 218 is connected to and extends from the second web 214. The first flange 216 and the second flange 218 are on opposite sides of the cap 220.

Generally, as illustrated in FIGS. 11-14, the bladder mandrel package 100 shapes the cap 220, the first web 212, and the second web 214 and the backing plate 508 shapes first flange 216 and the second flange 218. For example, the cap 220 is shaped by the top surface 140 of the bladder mandrel package 100, which may also be referred to as a cap-shaping surface. The first web 212 is shaped by the first side surface 142 of the bladder mandrel package 100, which may also be referred to as a first web-shaping surface. The second web 214 is shaped by the second side surface 144 of the bladder mandrel package 100, which may also be referred to as a second web-shaping surface. The first flange 216 and the second flange 218 are shaped by a surface 532 of the backing plate 508.

As illustrated in FIG. 12, in an example, the first radius filler 114 and the second radius filler 116 are positioned between the composite charge 202, the wrapped mandrel 124, and the backing plate 508. The first radius filler 114 accommodates and conforms to the curvature between first web 212, the wrapped mandrel 124, and the backing plate 508 (e.g., fills a three walled cavity). The second radius filler 116 accommodates and conforms to the curvature between second web 214, the wrapped mandrel 124, and the backing plate 508 (e.g., fills a three walled cavity). A portion of the wrap ply 102 extends between the first radius filler 114 and the second radius filler 116 and, thus, connects the first flange 216 and the second flange 218. In an example, a portion of the wrap ply 102, the first radius filler 114, and the second radius filler 116 form a bottom 222 of the compacted stringer package 206. The bottom 222 connects the first flange 216 and the second flange 218 and extends underneath the cap 220, the first web 212, and the second web 214.

As illustrated in FIG. 14, in an example where the inner mold line ply 122 is present, the first radius filler 114 and the second radius filler 116 are positioned between the composite charge 202, the wrapped mandrel 124, and the inner mold line ply 122. The first radius filler 114 accommodates and conforms to the curvature between first web 212, the wrapped mandrel 124, and the inner mold line ply 122 (e.g., fills a three walled cavity). The second radius filler 116 accommodates and conforms to the curvature between second web 214, the wrapped mandrel 124, and the inner mold line ply 122 (e.g., fills a three walled cavity). The inner mold line ply 122 extends over the first radius filler 114 and the second radius filler 116 and, thus, connects the first flange 216 and the second flange 218. In an example, the inner mold line ply 122 forms the bottom 222 of the compacted stringer package 206, The bottom 222 connects the first flange 216 and the second flange 218 and extends underneath the cap 220, the first web 212, and the second web 214.

In an example, application of pressure (e.g., applying mechanical pressure to shape the composite charge 202 or applying vacuum pressure to the stringer layup 204), as illustrated in FIG. 16, adheres the composite charge 202 to the wrap ply 102 of the bladder mandrel package 100. Application of pressure also adheres (e.g., at least tacks it in place) the composite charge 202 to the first radius filler 114 and the second radius filler 116. In an example where the inner mold line ply 122 is present, application of pressure also adheres (e.g., at least tacks it in place) the composite charge 202 to the inner mold line ply 122.

Following shaping and consolidation (e.g., by application of the mechanical pressure and/or the vacuum pressure), the compacted stringer package 206 is uncured, but is sufficiently rigid to be transported on the backing plate 508 within the manufacturing environment 250 (FIG. 1).

In an example, the compacted stringer package 206 is formed (e.g., shaped and consolidated) on the backing plate 508 (e.g., the rigid base 564). After forming the compacted stringer package 206, the compacted stringer package 206 is transported on the backing plate 508 for curing. This configuration beneficially enables the compacted stringer package 206 to be transported, as a consolidated whole, from the second location in the manufacturing environment 250, where the compacted stringer package 206 was formed, to a third location in the manufacturing environment 250, where the compacted stringer package 206 is to be cured to form the composite stringer 210.

Referring to FIGS. 1 and 17, in an example, the compacted stringer package 206 is placed onto a cure tool 550. In an example, the compacted stringer package 206 is placed into a hollow 552 of the cure tool 550. The hollow 552 is a unique location of the cure tool 550. The compacted stringer package 206 fits within the hollow 552. Generally, the shape of the hollow 552 of the cure tool 550 corresponds to the composite structure 200 being formed. For example, the geometry of the composite structure 200, such as the geometry of the composite stringer 210, drives design of the geometry of the hollow 552. The compacted stringer package 206 and the hollow 552 are formed with geometry suitable to result in the desired geometry of the composite structure 200. Further, the compacted stringer package 206 is complementary to any curvatures of the hollow 552.

As illustrated in FIG. 17, in an example, after placing the compacted stringer package 206 onto the cure tool 550, a composite skin 208 is placed over the compacted stringer package 206. The composite skin 208 and the compacted stringer package 206 are then co-cured on the cure tool 550 to form the composite structure 200 (FIG. 1). FIG. 17 depicts components of a composite layup forming the composite structure 200 prior to curing.

In an example, the composite structure 200 is an example of an aircraft type skin panel assembly. The composite skin 208 is an example of a skin of the aircraft type skin panel assembly. The compacted stringer package 206 is an example of a stiffener of the aircraft type skin panel assembly, such as the composite stringer 210. Therefore, in the illustrative example depicted in FIG. 17, surface 224 (e.g., outer or top surface) of the composite skin 208 forms the Outer Mold Line (OML) of the skin panel assembly and surface 226 (e.g., inner or bottom surface) of the composite skin 208 forms the Inner Mold Line (IML) of the skin panel assembly, which is placed against the compacted stringer package 206.

In the illustrative example depicted in FIG. 17, the compacted stringer package 206 includes the composite charge 202, the wrapped mandrel 124 (i.e., the mandrel 104 surrounded by the wrap ply 102), the first radius filler 114, the second radius filler 116, and the inner mold line ply 122. In such an example, the composite skin 208 is placed against the inner mold line ply 122. Although the example of the compacted stringer package 206 illustrated in FIG. 17 has a layup similar to the compacted stringer package 206 depicted in FIG. 14 (e.g., the inner mold line ply 122 is present), in other examples, the compacted stringer package 206 may have any desirable layup. For example, the compacted stringer package 206 may have a layup like the compacted stringer package 206 depicted in FIG. 12, including the composite charge 202, the wrapped mandrel 124 (i.e., the mandrel 104 surrounded by the wrap ply 102), the first radius filler 114, and the second radius filler 116. In such an example, the composite skin 208 is placed against the wrap ply 102, the first radius filler 114, and the second radius filler 116.

In an example, the composite skin 208 includes, or is formed of, a number of plies, or sheets, of a composite material. Each ply of the composite material includes reinforcing fibers bound in a polymer resin matrix. Resins used in the composite material may include thermoplastic or thermoset resins. The fibers may be unidirectional or may take the form of a woven cloth or fabric. The fibers of the composite material of different plies of the composite skin 208 may have the same fiber orientation or different orientations. Generally, the polymer resin matrix of the composite skin 208 is compatible with the polymer resin matrix of the composite charge 202, the polymer resin material of the first radius filler 114 and the second radius filler 116, the polymer resin matrix of the wrap ply 102, and the polymer resin matrix of the inner mold line ply 122, when present.

In an example, the fibers of the composite material of the composite skin 208, the fibers of the composite material of the composite charge 202, the fibers of the composite material of the wrap ply 102, and the fibers of the composite material of the inner mold line ply 122 have the same fiber orientation. In another example, one or more of the fibers of the composite material of the composite skin 208, the fibers of the composite material of the composite charge 202, the fibers of the composite material of the wrap ply 102, and the fibers of the composite material of the inner mold line ply 122 have different fiber orientations. In an example, each ply is made up of unidirectional tows or tapes laid adjacent to each other, which form a ply of parallel fibers of a particular orientation. In an example, ply-to-ply orientation of the fibers may be the same or may be different.

In an example, the bladder mandrel package 100 functions as a forming mandrel. In such an example, following formation (e.g., shaping and consolidation) of the compacted stringer package 206, the mandrel 104 is removed from the compacted stringer package 206. Following removal of the mandrel 104, the wrap ply 102, the first radius filler 114, the second radius filler 116, and the inner mold line ply 122, when present, remain part of the compacted stringer package 206. In an example, following removal of the mandrel 104 from the compacted stringer package 206, the compacted stringer package 206 is placed in the cure tool 550 (FIG. 17) and is cured to form the composite stringer 210. In such an example, a vacuum bag, an inflatable bladder, or another type of pressurized device is used to internally support the compacted stringer package 206 during cure. Following curing, the composite charge 202, the wrap ply 102, the first radius filler 114, the second radius filler 116, and the inner mold line ply 122, when present, form the composite stringer 210.

Accordingly, the mandrel 104 may be made of any material capable of supporting and maintaining the shape of the compacted stringer package 206 during formation, while also being readily removable from the compacted stringer package 206 following formation of the compacted stringer package 206.

In another example, the bladder mandrel package 100 functions as a forming mandrel and as a curing mandrel. In such an example, the bladder mandrel package 100 remains in the compacted stringer package 206 during curing of the compacted stringer package 206 to form the composite stringer 210. Following curing of the compacted stringer package 206 and forming of the composite stringer 210, the mandrel 104 is removed from the composite stringer 210. Following curing, the composite charge 202, the wrap ply 102, the first radius filler 114, the second radius filler 116, and the inner mold line ply 122, when present, form the composite stringer 210. Following removal of the mandrel 104, the wrap ply 102, the first radius filler 114, the second radius filler 116, and the inner mold line ply 122, when present, remain part of the composite stringer 210.

Accordingly, the mandrel 104 may be made of any material capable of supporting and maintaining the shape of the compacted stringer package 206 during formation and curing, while also being readily removable from the composite structure 200 (e.g., the composite stringer 210) following formation of the composite structure 200. Examples of the mandrel 104 include at least one of a solid mandrel, a hollow mandrel, a collapsible mandrel, a dissolvable mandrel, or an inflatable mandrel.

In an example, a collapsible mandrel includes foam portions and a rigid center. Collapsing the foam portions of the collapsible mandrel enables removal of the mandrel 104 from the remainder of composite structure 200 following formation. The minimum reduction in volume needed to remove the collapsible mandrel may depend on various factors, such as the contour of the composite stringer 210.

In an example, an inflatable mandrel includes an inflatable bladder made of any desirable material, such as a polymeric material, a metallic material, or other suitable airtight material. Deflating the inflatable bladder of the inflatable mandrel enables removal of the mandrel 104 from the remainder of composite structure 200 following formation.

In any of such examples, the bladder mandrel package 100 includes a means or mechanism for removal of the mandrel 104 from the compacted stringer package 206, whether performed before curing or after curing. In an example, the bladder mandrel package 100 includes one or more additional layers of material located between the mandrel 104 and the wrap ply 102. The one or more additional layers of material may be wrapped around the mandrel 104 prior to wrapping the mandrel 104 with the wrap ply 102. For example, the bladder mandrel package 100 may include the release ply (not shown) configured to prevent the wrap ply 102 from adhering to the mandrel 104 during consolidation of the bladder mandrel package 100, during consolidation of the compacted stringer package 206, and/or during curing of the compacted stringer package 206.

Although not illustrated, in one or more examples, the compacted stringer package 206 may have complex contours. In an example, the compacted stringer package 206 may have a number of complex contours along its length. The contours of the compacted stringer package 206 may be constant or varying. In an example, the compacted stringer package 206 may have curvatures in the X-Y plane and/or curvatures in the X-Z plane. In an example, the compacted stringer package 206 may also be twisted for example, along an X-axis. The compacted stringer package 206 may be twisted at a constant or varying angle. For the purpose of the present disclosure, the term "curvature" refers to a bend or a joggle along a primary longitudinal axis. For the purpose of the present disclosure, the term "twist" refers to rotation about a longitudinal axis while still running primarily longitudinal, rather than a bend or a joggle.

Figure 18:
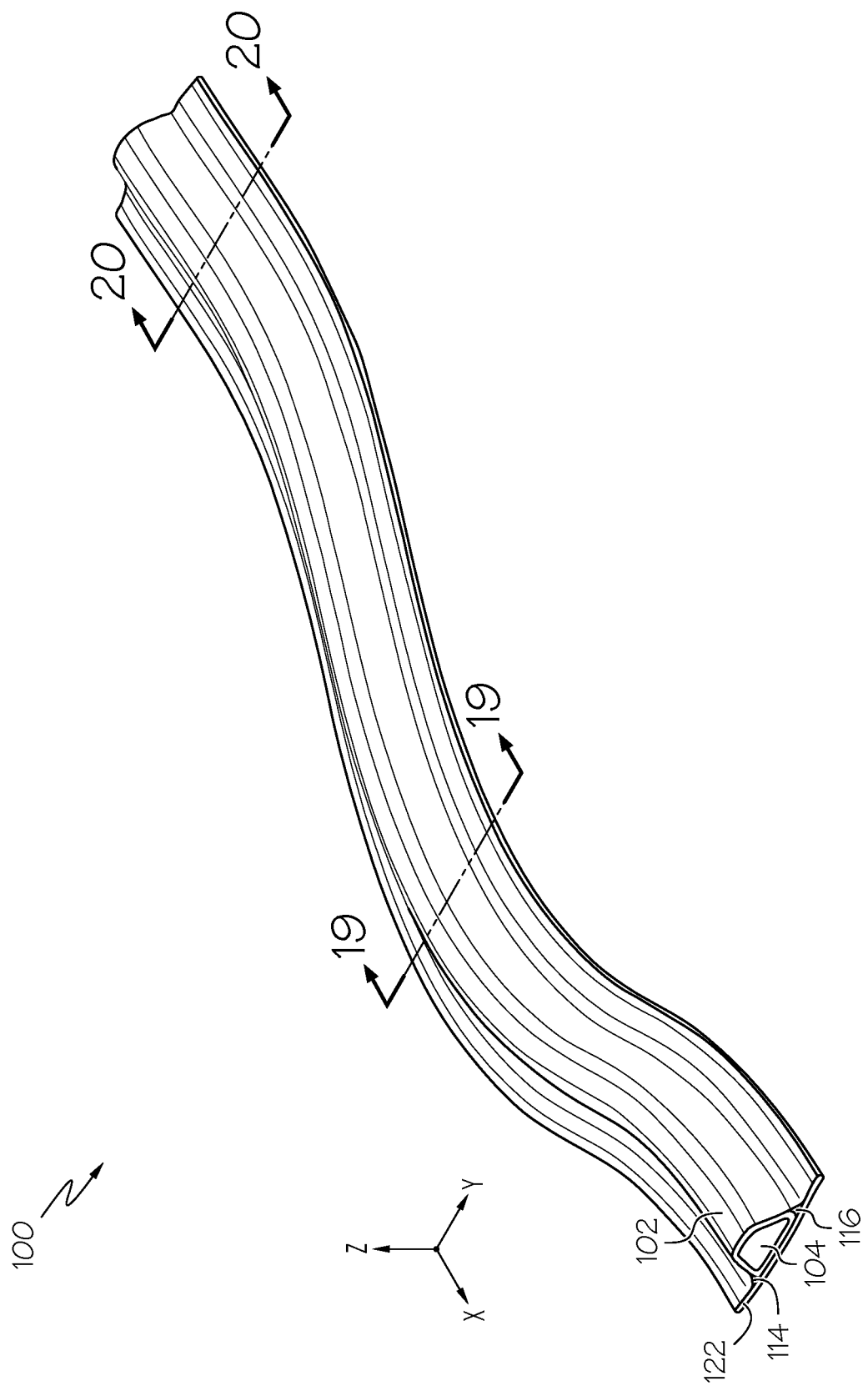
FIG. 18 is a schematic, perspective view of an example of the bladder mandrel package having a contour.
Figure 19:
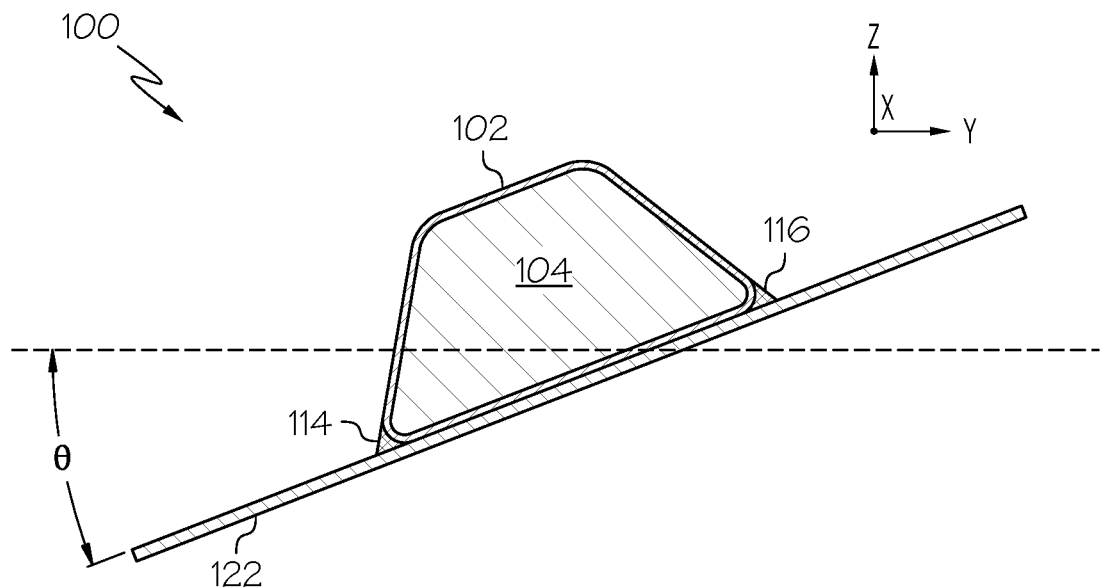
FIG. 19 is a schematic, sectional view of an example of the bladder mandrel package having a contour of FIG. 18.
Figure 20:
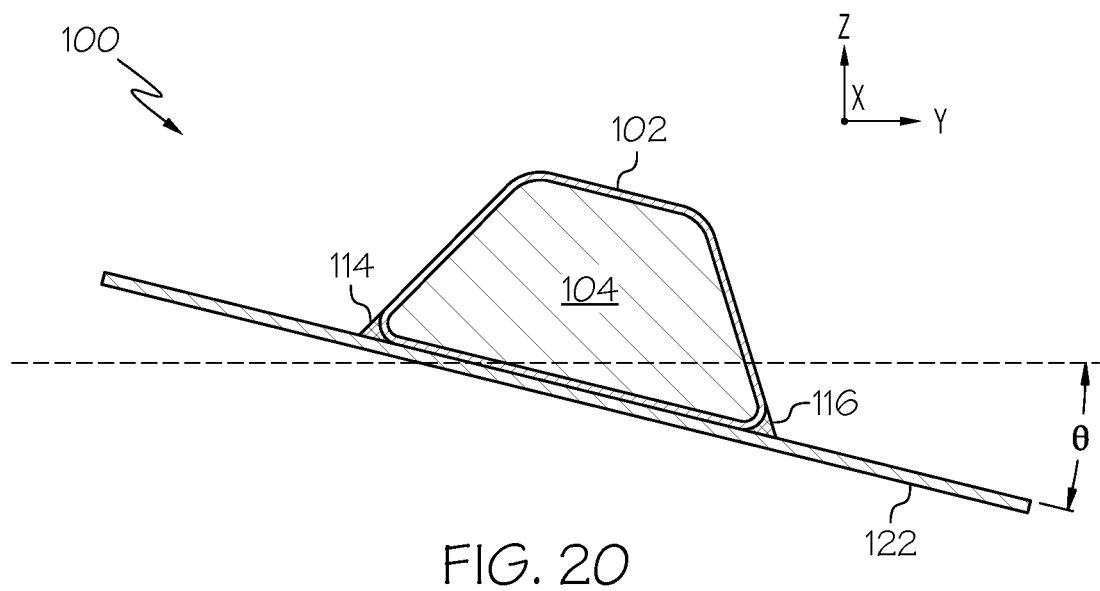
FIG. 20 is a schematic, sectional view of an example of the bladder mandrel package having a contour of FIG. 18.

Accordingly, and as illustrated in FIGS. 18-22, in one or more examples, the bladder mandrel package 100 may have complex contours that define the contours of the compacted stringer package 206 formed using the bladder mandrel package 100. As illustrated in FIGS. 18-22, in an example, the bladder mandrel package 100 may have a number of complex contours along its primary longitudinal axis (i.e., its length). The contours of the bladder mandrel package 100 may be constant or varying. The contours may include one or more of a bend, a joggle, and/or a twist. In an example, the bladder mandrel package 100 has curvatures in the X-Y plane and/or curvatures in the X-Z plane. In an example, the bladder mandrel package 100 is also twisted. The bladder mandrel package 100 may be twisted at a constant or varying angle θ (FIGS. 19 and 20).

Figure 21:
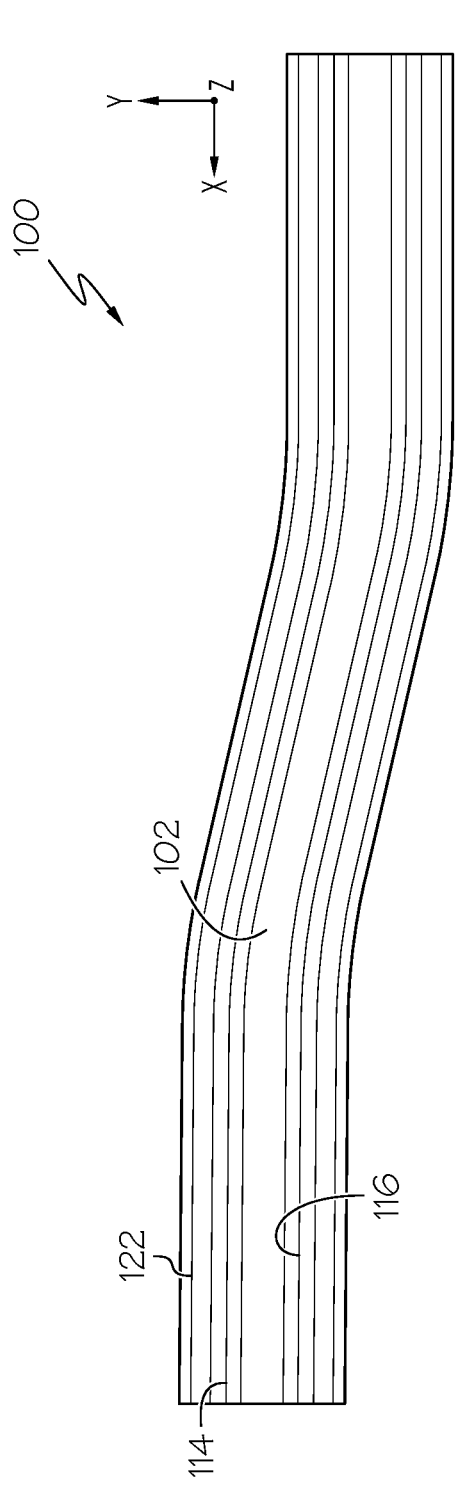
FIG. 21 is a schematic, plan view of an example of the bladder mandrel package having a contour of FIG. 18.
Figure 22:
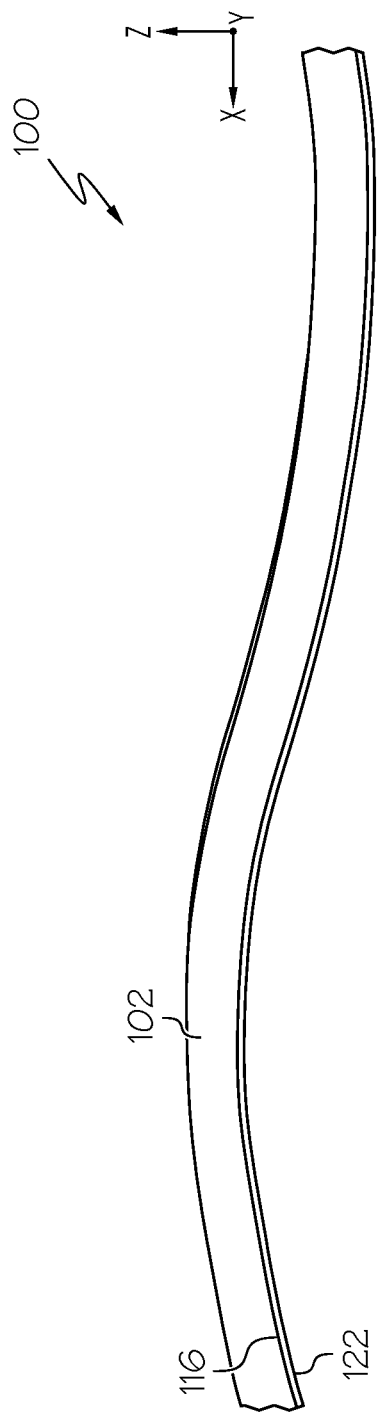
FIG. 22 is a schematic, elevation view of an example of the bladder mandrel package having a contour of FIG. 18.

FIG. 18 illustrates the complex contour (e.g., curvature and twist) of the bladder mandrel package 100. FIGS. 19 and 20 illustrate twists of the bladder mandrel package 100 within the Y-Z plane. FIG. 21 illustrates a joggle of the bladder mandrel package 100 in the X-Y plane. FIG. 22 illustrates a bend of the bladder mandrel package 100 in the X-Z plane.

Although the example of the bladder mandrel package 100 illustrated in FIGS. 18-22 has a layup similar to the bladder mandrel package 100 illustrated in FIG. 3 (e.g., the inner mold line ply 122 is present), in other examples, the bladder mandrel package 100 may have any desirable layup. For example, the bladder mandrel package 100 may have a layup like the bladder mandrel package 100 illustrated in FIG. 2.

Accordingly, in one or more examples, the bladder mandrel package 100 of compacted stringer package 206 has a contour in at least one of the X-Y axis, the X-Z axis and/or the Y-Z axis. Generally, the contour of the bladder mandrel package 100 corresponds to the desired contour of the composite stringer 210, or composite structure 200, being formed. For example, the contour of the composite structure 200, such as the contour of the composite stringer 210, drives design of the contour of the compacted stringer package 206 and, thus, the bladder mandrel package 100. The bladder mandrel package 100 and the compacted stringer package 206 are formed with contours suitable to result in the desired contour of the composite structure 200, such as the composite stringer 210.

Accordingly, in an example, the curvature of the bladder mandrel package 100 imparts curvature to the compacted stringer package 206. Twist in the Y-Z plane may also be referred to as roll, curvature (e.g., bend or joggle) in the X-Z plane may also be referred to as pitch, and curvature (e.g., bend or joggle) in the X-Y plane may also be referred to as yaw.

In examples where the bladder mandrel package 100 has a curvature, the base plate 508 has a complementing curvature. Further, in examples, where the bladder mandrel package 100 has curvature, the tooling surfaces of the respective die-first portion 512 and die-second portion 514 of the die tool 502 that define the cavity 504 (FIGS. 4-10) have complementing curvatures. Moreover, in examples, where the bladder mandrel package 100 and, thus, the compacted stringer package 206 have a curvature, the hollow 552 of the cure tool 550 (FIG. 17) has a complementing curvature.

Referring to FIG. 1, in an example, the compacted stringer package 206 is one of a plurality of compacted stringer packages. As such, the composite stringer 210 is one of a plurality of composite stringers of the composite structure 200. In an example, to form the composite structure 200, such as a portion of a fuselage or a wing of an aircraft, the plurality of compacted stringer packages is formed. The plurality of compacted stringer packages includes any quantity of compacted stringer packages. While not explicitly illustrated, the plurality of compacted stringer packages include respective composite charges having partially closed cross-sections (e.g., a hat-shaped cross-section) formed on respective bladder mandrel packages. For example, each one of the plurality of compacted stringer packages includes a composite charge, a first radius filler contacting the composite charge, a second radius filler contacting the composite charge, and a wrapped mandrel positioned within a cap, a first web, and a second web, and, optionally, an inner mold line ply extending between a first flange and a second flange.

In such an example, forming the plurality of compacted stringer packages includes placing a plurality of composite charges each over a respective bladder mandrel package. Each respective bladder mandrel package has a complementary curvature to a respective rigid base (e.g., backing plate).

In an example, the compacted stringer packages 206 are placed onto the cure tool 550 to form the composite stringers 210. In an example, each one of the compacted stringer packages 206 has a curvature complementary to a unique location on the cure tool 550. When each one of the compacted stringer packages 206 has a curvature complementary to a unique location, each one of the compacted stringer packages 206 has its own respective bladder mandrel package 100 and its own respective backing plate 508 (e.g., rigid base 564).

In an example, after placing all desired compacted stringer packages 206 onto the cure tool 550, one or more composite skins 208 are placed over the compacted stringer packages 206. The composite skins 208 and the compacted stringer packages 206 are then co-cured on the cure tool 550.

In one or more examples, although not depicted in FIG. 1, the manufacturing environment 250 may include a number of carriers, a number of shuttles, or other composite ply movement and placement equipment. In one or more examples, at least of the mandrel 104, the wrap ply 102, the first radius filler 114, the second radius filler 116, and/or the inner mold line ply 122 may be moved and placed using equipment for formation of the bladder mandrel package 100. In one or more examples, at least one of the composite charge 202 and/or the bladder mandrel package 100 (e.g., positioned on the backing plate 508) may be moved and placed using equipment for formation of the compacted stringer package 206. In one or more examples, the compacted stringer package 206 (e.g., positioned on the backing plate 508) may be moved and placed using equipment for formation of the composite stringer 210. In other examples, one or more components may be moved or placed by hand.

In one or more examples, although not depicted in FIG. 1, heating equipment may be present in the manufacturing environment 250. Heat may be applied using any desirable form of heating equipment. In an example, the wrap ply 102, the first radius filler 114, the second radius filler 116, and, when present, the inner mold line ply 122, may be heated while the vacuum pressure is applied to the bladder mandrel layup 128 to form the compacted bladder mandrel package 100. In an example, the heat increases the tack of the resin in the plies of composite material. In an example, the stringer layup 204 is heated while the vacuum pressure is applied to the stringer layup 204 to form the compacted stringer package 206. Heating of the stringer layup 204 causes the composite material in the stringer layup 204 to become more pliable than at room temperature. By heating the stringer layup 204 while forming the compacted stringer package 206, fewer inconsistencies may be present in the compacted stringer package 206.

Figure 23:
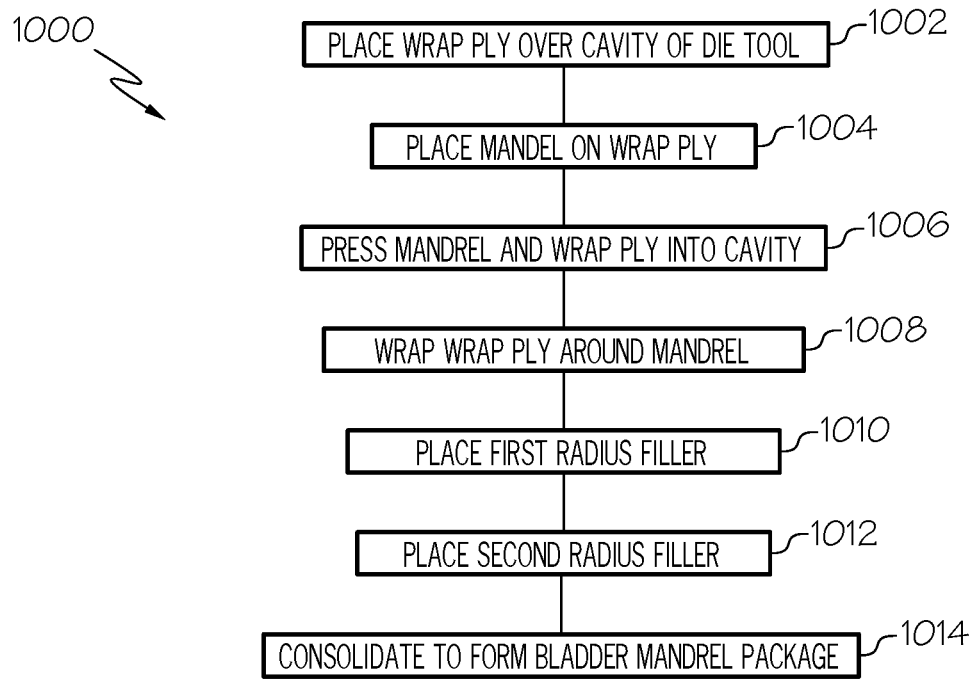
FIG. 23 is a schematic flow diagram of an example of a method for manufacturing the bladder mandrel package.

Referring generally to FIGS. 1 and 2 and particularly to FIG. 23, the present disclosure provides examples of a method 1000 for manufacturing the bladder mandrel package 100 that is used to manufacture the composite structure 200. Generally, examples of the method 1000 may be used to form any of the examples of the bladder mandrel package 100 disclosed herein, such as the example of the bladder mandrel package 100 illustrated in FIG. 2 and/or the example of the bladder mandrel package 100 illustrated in FIG. 3.

Referring generally to FIGS. 4-10 and particularly to FIG. 23, in an example, the method 1000 includes (e.g., begins at) a step (Block 1002) of placing the wrap ply 102 over the cavity 504 of the die tool 502, as depicted in FIG. 4. The method 1000 includes a step (Block 1004) of placing the mandrel 104 onto the wrap ply 102, as depicted in FIG. 3. The method 1000 includes a step (Block 1006) of pressing the mandrel 104 and the wrap ply 102 into the cavity 504, as depicted in FIG. 5. The method 1000 includes a step (Block 1008) of wrapping the wrap ply 102 around the mandrel 104 to form the wrapped mandrel 124, as depicted in FIGS. 5 and 6. The method 1000 includes a step (Block 1010) of placing the first radius filler 114 at the first radius 118 of the wrapped mandrel 124, as depicted in FIG. 7. The method 1000 includes a step (Block 1012) of placing the second radius filler 116 at the second radius 120 of wrapped mandrel 124, as depicted in FIG. 7. The method 1000 includes a step (Block 1014) of consolidating the mandrel 104, the wrap ply 102, the first radius filler 114, and the second radius filler 116 to form the bladder mandrel package 100, as depicted in FIG. 9. In an example, the method 1000 terminates after the step (Block 1014) of consolidating.

Referring generally to FIGS. 4 and 5 and particularly to FIG. 23, in an example, the method 1000 includes a step of moving (e.g., separating) the die-first portion 512 of the die tool 502 and the die-second portion 514 of the die tool 502 relative to each other during the step (Block 1006) of pressing the mandrel 104 and the wrap ply 102 into the cavity 504. In an example, the die-first portion 512 and the die-second portion 514 move away from each other (e.g., separate) to enlarge the cavity 504 in response to the mandrel 104 and the wrap ply 102 being pressed into the cavity 504.

In an example, the method 1000 includes a step of matingly engaging the first interleafing fingers 544 of the die-first portion 512 and the second interleafing fingers 546 of the second-die portion 514 when moving the die-first portion 512 of the die tool 502 and the die-second portion 514 of the die tool 502 relative to each other (e.g., farther apart or closer together). For examples, the step of moving (e.g., separating) the die-first portion 512 and the die-second portion 514 relative to each other includes a step of interleafingly moving (e.g., separating) the die-first portion 512 and the die-second portion 514 relative to each other.

Referring generally to FIG. 4, in an example, the method 1000 includes a step of supporting the wrap ply 102 with the wedge 554 located in the cavity 504. In an example, supporting the wrap ply 102 with the wedge 554 presses the central portion 156 of the wrap ply 102 against the top surface 106 of the mandrel 104 using the third tooling surface 556 of the wedge 554.

Referring generally to FIG. 5, in an example, the method 1000 includes a step of driving separation of the die-first portion 512 and the die-second portion 514 using the wedge 554 when pressing the mandrel 104 and the wrap ply 102 into the cavity 504.

Referring generally to FIGS. 5, 6A, and 6B and particularly to FIG. 23, according to the method 1000, in an example, the step (Block 1008) of wrapping includes a step of sweeping the first intermediate portion 158 of the wrap ply 102 over the second side surface 110 of the exterior surface 126 of the mandrel 104 using the die tool 502 to form the partially wrapped mandrel 146, as depicted in FIG. 5, to partially surround the mandrel 104 with the wrap ply 102 and partially form the partially wrapped mandrel 146. In an example, the step (Block 1008) of wrapping includes a step of sweeping the second intermediate portion 160 of the wrap ply 102 over the first side surface 108 of the exterior surface 126 of the mandrel 104 using the die-second portion 514, as illustrated in FIG. 5, to further surround the mandrel 104 with the wrap ply 102 and form the partially wrapped mandrel 146. In an example, the step (Block 1008) of wrapping also includes a step of sweeping a first end portion 130 and a second end portion 132 of the wrap ply 102 over the bottom surface 112 of the exterior surface 126 of the mandrel 104 using the sweep arms 510, as depicted in FIGS. 6A and 6B, to completely surround the mandrel 104 with the wrap ply 102 and form the wrapped mandrel 124.

In an example, the method 1000 includes a step of placing the inner mold line ply 122 onto the wrapped mandrel 124, the first radius filler 114, and the second radius filler 116 prior to the step (Block 1014) of consolidating, as depicted in FIG. 8. According to the method 1000, in an example, the step (Block 1014) of consolidating includes a step of consolidating the mandrel 104, the wrap ply 102, the first radius filler 114, the second radius filler 116, and the inner mold line ply 122 to form the bladder mandrel package 100, as depicted in FIG. 10.

According to the method 1000, in an example, the step (Block 1014) of consolidating includes a step of applying vacuum pressure. In an example, the vacuum pressure is applied to the first radius filler 114, the second radius filler 116, and the wrapped mandrel 124 (i.e., the mandrel 104 surrounded by the wrap ply 102), as depicted in FIG. 9. In another example, the vacuum pressure is applied to the inner mold line ply 122, the first radius filler 114, the second radius filler 116, and the wrapped mandrel 124 (i.e., the mandrel 104 surrounded by the wrap ply 102), as depicted in FIG. 10.

In an example, the method 1000 includes a step of placing the vacuum bagging film 506 over the cavity 504 of the die tool 502 prior to the step (Block 1002) of placing the wrap ply 102. In an example, the wrap ply 102 is placed onto, or over, the vacuum bagging film 506. According to the method 1000, in an example, the vacuum bagging film 506 is placed on the wedge 554 and the wrap ply 102 is placed on the vacuum bagging film 506. In other words, the step (Block 1002) of placing the wrap ply 102 includes a step of placing the wrap ply 102 on the vacuum bagging film 506 over the cavity 504. In an example, the method 1000 includes a step of sealing the backing plate 508 to the vacuum bagging film 506 for application of the vacuum pressure, for example, during the step (Block 1014) of consolidating.

In an example, the method 1000 includes a step of coupling the bladder mandrel package 100 to the backing plate 508 and a step of removing the bladder mandrel package 100 from the cavity 504 of the die tool 502 following the step (Block 1014) of consolidating.

In an example, the method 1000 includes a step of adhering the first radius filler 114 and the second radius filler 116 to the wrap ply 104 during the step (Block 1014) of consolidating. In an example, the method 1000 includes a step of adhering the inner mold line ply 122 to the first radius filler (114), the second radius filler (116), and the wrap ply (104) during the step (Block 1014) of consolidating.

Figure 24:
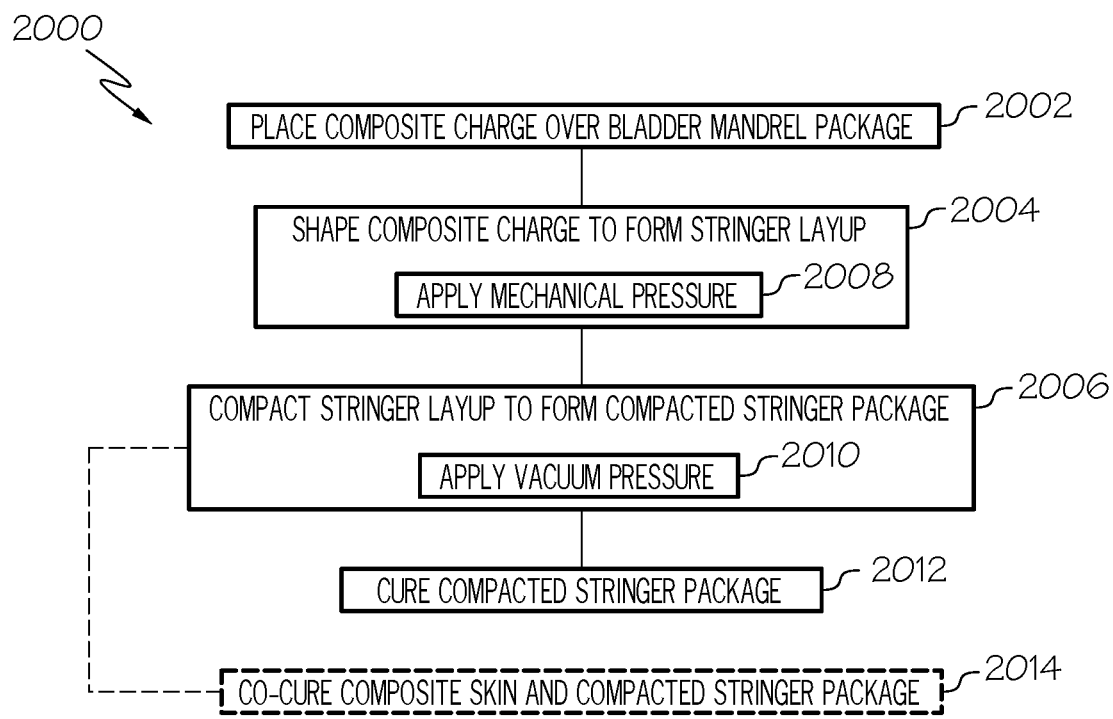
FIG. 24 is a schematic flow diagram of an example of a method for manufacturing a composite structure.

Referring generally to FIGS. 11-17 and particularly to FIG. 24, the present disclosure provides examples of a method 2000 for manufacturing the composite structure 200. Generally, examples of the method 2000 may be used to form any of the examples of the composite structure 200 disclosed herein, such as examples of the composite stringer 210 and/or examples of the composite structure 200 that includes one or more composite stringers 210 and one or more composite skins 208.

Referring generally to FIGS. 11-17 and particularly to FIG. 24, in an example, the method 2000 includes (e.g., begins at) a step (Block 2002) of placing the composite charge 202 over the bladder mandrel package 100, as depicted in FIGS. 11 and 13. In an example, the method 2000 includes a step (Block 2004) of shaping the composite charge 202 to the bladder mandrel package 100 to form the stringer layup 204, as depicted in FIG. 16. In an example, the method 2000 includes a step (Block 2006) of compacting the stringer layup 204, as illustrated in FIG. 16, to form the compacted stringer package 206 (FIGS. 12 and 14).

Referring generally to FIGS. 15 and 16 and particularly to FIG. 24, according to the method 2000, in an example, the step (Block 2004) of shaping the composite charge 202 includes a step (Block 2008) of applying mechanical pressure to shape the composite charge 202 to shape the composite charge 202 over the bladder mandrel package 100 and the backing plate 508 to form the stringer layup 204. According to the method 2000, in an example, the step (Block 2006) of compacting the stringer layup 204 includes a step (Block 2010) of applying vacuum pressure to the stringer layup to form the compacted stringer package 206 (FIGS. 12 and 14). In an example, the method 2000 terminates after the step (Block 2004) of shaping the composite charge 202 and the step (Block 2006) of compacting the stringer layup 204.

According to the method 2000, in an example, the bladder mandrel package 100 includes the wrapped mandrel 124. The wrapped mandrel 124 includes the mandrel 104 and the wrap ply 102 wrapped around, or surrounding, the mandrel 104, as depicted in FIGS. 2 and 3. In an example, the bladder mandrel package 100 includes the first radius filler 114, coupled to the first radius 118 of the wrapped mandrel 124, and the second radius filler 116, coupled to a second radius 120 of the wrapped mandrel 124. In such an example, the mandrel 104, the wrap ply 102, the first radius filler 114, and the second radius filler 116 are consolidated to from the bladder mandrel package 100.

According to the method 2000, in another example, the bladder mandrel package 100 also includes the inner mold line ply 122, coupled to the wrapped mandrel 124, the first radius filler 114, and the second radius filler 116. In such an example, the mandrel 104, the wrap ply 102, the first radius filler 114, the second radius filler 116, and the inner mold line ply 122 are consolidated to from the bladder mandrel package 100.

In an example, the method 2000 includes a step of adhering the composite charge 202 to the wrap ply 102 during at least one of the step (Block 2004) of shaping the composite charge 202 and/or the step (Block 2006) of compacting the stringer layup 204. In an example, the method 2000 includes a step of adhering the composite charge 202 to the first radius filler 114 and the second radius filler 116 during at least one of the step (Block 2004) of shaping the composite charge 202 and/or the step (Block 2006) of compacting the stringer layup 204. In an example where the inner mold line ply 122 is present, the method 2000 includes a step of adhering the composite charge 202 to the inner mold line ply 122 during at least one of the step (Block 2004) of shaping the composite charge 202 and/or the step (Block 2006) of compacting the stringer layup 204.

In an example, the method 2000 includes a step of placing the compacted stringer package 206 onto the cure tool 550. In an example, the method 2000 includes a step (Block 2012) of curing the compacted stringer package 206 to form the composite structure 200. In an example, the method 2000 terminates after the step of curing the compacted stringer package 206.

Alternatively, in another example, the method 2000 includes a step of placing the composite skin 208 onto the compacted stringer package 206. In such an example, the method 1000 includes a step (Block 2014) of co-curing the composite skin 208 and the compacted stringer package 206 to form the composite structure 200. In an example, the method 2000 terminates after the step of co-curing the composite skin 208 and compacted stringer package 206.

According to the method 2000, in an example, the compacted stringer package 206 is kept on the backing plate 508 on which it was formed during the step of placing the compacted stringer package 206 onto the cure tool 550. Alternatively, in another example, the method 2000 includes a step of removing the compacted stringer package 206 from the backing plate 508 prior to placing the compacted stringer package 206 into the cure tool 550.

In an example, the method 2000 includes a step of removing the mandrel 104 from the composite structure 200 after the step of curing the compacted stringer package 206 or the step of co-curing the composite skin 208 and the compacted stringer package 206. In an example, the method 2000 terminates after the step of removing the mandrel 104 from the composite structure 200. Alternatively, in another example, the method 2000 includes a step of removing the mandrel 104 from the compacted stringer package 206 prior to the step of curing the compacted stringer package 206 or the step of co-curing the composite skin 208 and the compacted stringer package 206.

In an example, upon removal of the mandrel 104 from the compacted stringer package 206 (e.g., before curing), the wrap ply 102, the first radius filler 114, the second radius filler 116, and, optionally, the inner mold line ply 122, when present, remain part of the compacted stringer package 206. In an example, upon removal of the mandrel 104 from the composite stringer 210 (e.g., after curing), the wrap ply 102, the first radius filler 114, the second radius filler 116, and, optionally, the inner mold line ply 122, when present, remain part of composite stringer 210 (e.g., the composite structure 200).

In an example, the compacted stringer package 206 and the composite stringer 210 have a partially closed cross-section, such as the hat-shaped cross-section. In an example, the compacted stringer package 206 and the composite stringer 210 include the cap 220, the first web 212, and the second web 214, shaped by the bladder mandrel package 100. In an example, the compacted stringer package 206 and the composite stringer 210 include the first flange 216 and the second flange 218, shaped by the backing plate 508 (e.g., the rigid base 564). In an example where the bladder mandrel package 100 includes the inner mold line ply 122, the compacted stringer package 206 and the composite stringer 210 includes the bottom 222, connecting the first flange 216 and the second flange 218 and extending underneath the cap 220, the first web 212, and the second web 214.

The present disclosure also provides examples of a method for manufacturing a plurality of the compacted stringer packages 206 and, thus, a plurality of the composite stringers 210 of the composite structure 200. The method may be performed using at least one compacted stringer package 206 formed using at least one bladder mandrel package 100.

In an example, the method includes a step of forming a plurality compacted stringer packages using a plurality of bladder mandrel packages. Each one of the compacted stringer packages including a composite charge having a hat-shaped cross-section, a first radius filler contacting the composite charge, a second radius filler contacting the composite charge, and bladder mandrel package positioned within a cap, a first web, and a second web of the hat-shaped cross-section of the compacted stringer package. In an example, the step of forming the plurality of compacted stringer packages includes a step of placing each one of a plurality of composite charges over a respective one of a plurality of bladder mandrel packages, applying mechanical pressure to shape each of the plurality of composite charges to a respective one of the plurality of bladder mandrel packages and a respective one of a plurality of base plates (e.g., rigid bases) to form a plurality of stringer layups, and applying vacuum pressure to each one of the plurality of stringer layups to form the plurality of compacted stringer packages.

In an example, the method also includes a step of placing the plurality of compacted stringer packages onto a cure tool. In an example, the method includes a step of curing the plurality of compacted stringer packages to form a plurality of composite stringers. In an example, the method includes a step of removing the mandrel of each of the plurality of bladder mandrel packages from a respective one of the plurality of composite stringers after curing.

In an example, each of the plurality of compacted stringer packages has a curvature complementary to a unique location on the cure tool. In an example, one of the compacted stringer packages is placed onto the cure tool at a time. In another example, multiple compacted stringer packages are placed onto the cure tool at substantially the same time.

In an example, the plurality of compacted stringer packages is placed onto the cure tool by a number of human operators. In another example, the plurality of compacted stringer packages is placed onto the cure tool by a number of robots using automation.

According to the examples provided by the present disclosure, forming the bladder mandrel package 100 on the backing plate 508 at a first location in the manufacturing environment 250 and then transporting the bladder mandrel package 100 on the backing plate 508, as a consolidated whole, to a second location in the manufacturing environment 250 for forming the compacted stringer package 206 on the backing plate 508 and then transporting the compacted stringer package 206 on the backing plate 508, as a consolidated whole, to a third location in the manufacturing environment 250 for curing and forming the composite structure 200 may significantly improve flow time and efficiency in the work flow path of an aircraft build. The examples provided herein also enable flexibility to use automation in stringer fabrication and stringer installation. The examples provided herein also moves significant work out of the critical flow path. Thus, the examples provided here may reduce composite fabrication flow time and allow process automation.

In one or more examples, the composite structure 200 is a manufactured article or a manufactured component, such as a constituent part or element, of a manufactured article. In an example, the composite structure 200 is a vehicle, such as an aircraft. In an example, the composite structure 200 is a sub-assembly of a vehicle, such as a fuselage, a wing, or an interior of an aircraft. In an example, the composite structure 200 is, or includes, a component of a vehicle or a sub-assembly of the vehicle, such as a skin panel (e.g., the composite skin 208), a frame member, a stiffening member (e.g., the composite stringer 210), or an interior panel of an aircraft.

The composite structure 200 may be made of any suitable composite material. In an example, the composite structure 200 is formed by combining two or more functional composite materials, such reinforcing fibers bound in a polymer resin matrix. The matrix material may take the form of a thermoset resin (e.g., epoxy), a thermoplastic polymer (polyester, vinyl ester, nylon, etc.), or other types of matrix material. The reinforcement material may take the form of fibers (e.g., glass fibers, carbon fibers, aramid fibers, etc.) or other types of reinforcement materials. The fibers may be unidirectional or may take the form of a woven or nonwoven cloth, fabric, or tape. The fibers and resins may be arranged and cured to form the composite structure 200.

Composite materials are used in aircraft to decrease weight of the aircraft. This decreased weight improves performance features such as payload capacity and fuel efficiency. Further, composite materials provide longer service life for various components in an aircraft. Composite materials may be tough, light-weight materials created by combining two or more functional components.

Composite stringers may be attached to a composite skin using fasteners, curing the composite stringers to the composite skin, or by other desirable methods. Fasteners add to the weight of the aircraft. One or more of the examples herein provide for curing the composite stringers to the composite skin as a desirable attachment method.

Figure 25:
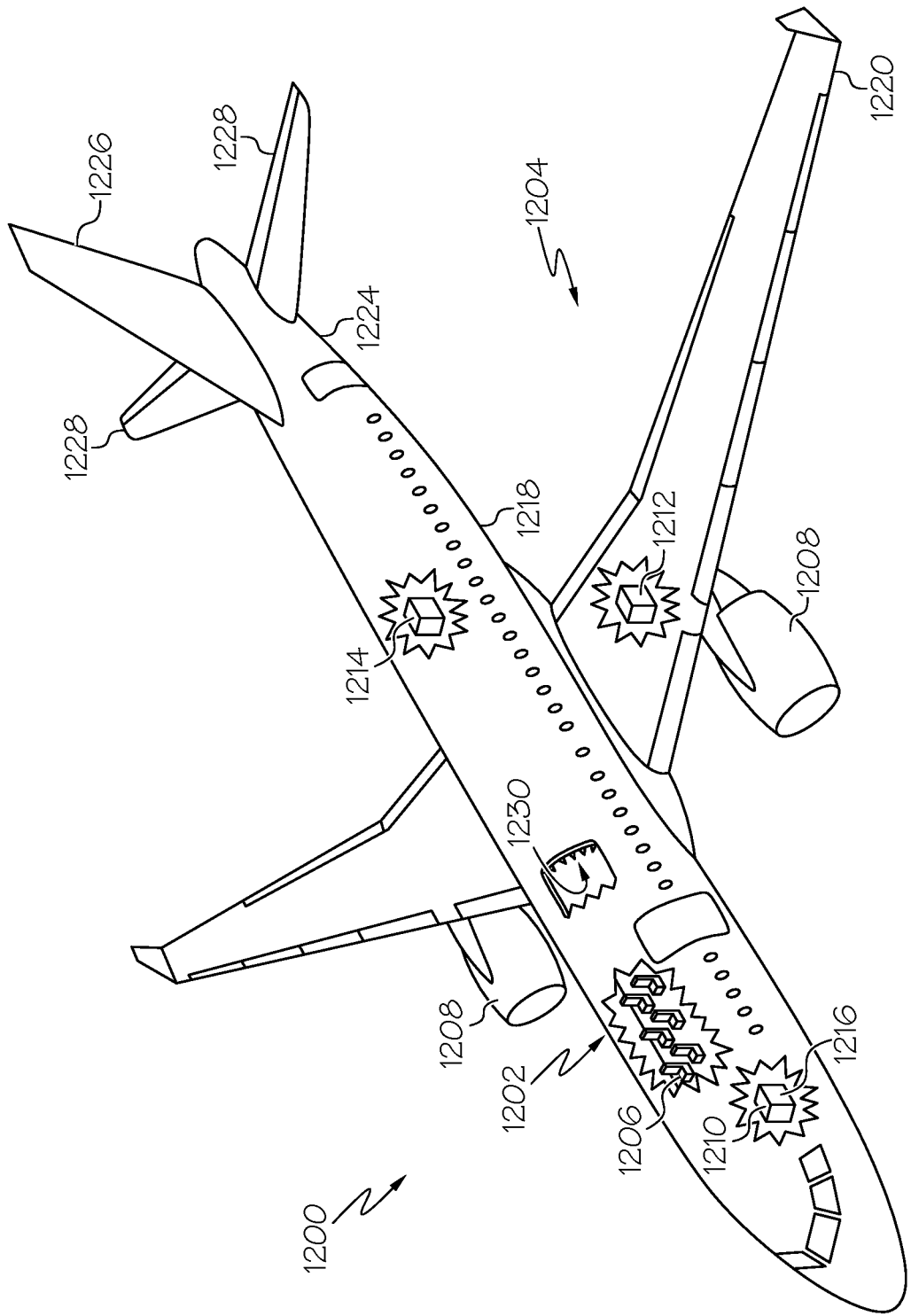
FIG. 25 is a schematic illustration of an example of an aircraft.
Figure 26:
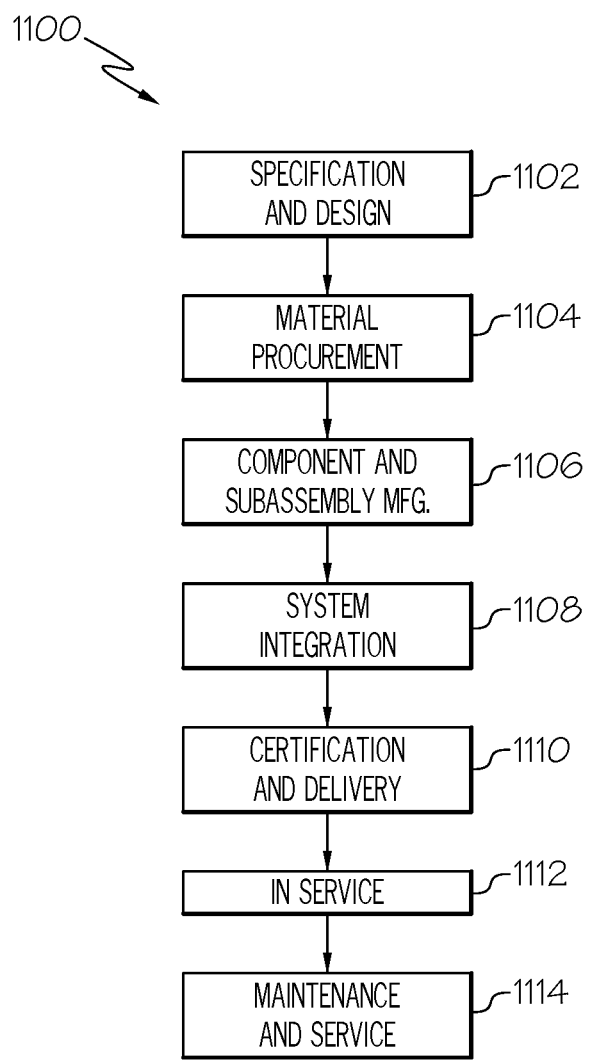
FIG. 26 is a flow diagram of an example aircraft production and service methodology.

Examples of the system and method disclosed herein may find use in a variety of potential applications, particularly in the transportation industry, including for example, aerospace applications. Referring now to FIGS. 25 and 26 examples of the bladder mandrel package 100, the compacted stringer package 206, the composite structure 200, and methods 1000 and 2000 may be used in the context of an aircraft 1200, as shown in FIG. 25, and an aircraft manufacturing and service method 1100, as shown in the flow diagram of FIG. 26. Aircraft applications of the disclosed examples may include formation of composite structures used to form various components used in the manufacture of aircraft, such as portions of a fuselage, portions of a wing, and the like.

As illustrated in FIG. 25, in an example, the aircraft 1200 is a fixed-wing aircraft. The aircraft 1200 includes an airframe 1202 and a plurality of high-level systems 1204. Examples of the high-level systems 1204 include one or more of a propulsion system 1208, an electrical system 1210, a hydraulic system 1212, an environmental system 1214 and a communications system 1216. In other examples, the aircraft 1200 may include any number of other types of systems.

In an example, the airframe 1202 forms a fuselage 1218 of the aircraft 1200. The fuselage 1218 defines an interior 1206 of the aircraft 1200, which may include a passenger compartment and/or a cargo compartment. The fuselage 1218 is the main body of the aircraft 1200 and includes any suitable central structure configured to hold a crew, one or more passengers, and/or cargo. In the illustrative example, the fuselage 1218 is an elongate, generally cylindrical fuselage. The aircraft 1200 also includes a pair of wings 1220 (also referred to individually as wing 1220). Each one of the wings 1220 is coupled to the fuselage 1218. The wings 1220 include any suitable airfoil structures that are configured to provide lift to the aircraft 1200. The fuselage 1218 includes a nose section at a forward end of the aircraft 1200 and a tail section 1224 at an aft end of the aircraft 1200. As used herein, the terms "forward" and "aft" have their ordinary meaning as known to those skilled in the art and refer to positions relative to a direction of movement of the aircraft 1200. The tail section 1224 includes a vertical stabilizer 1226 and at least one horizontal stabilizer 1228.

The aircraft 1200 is an example of an aircraft manufactured using the compacted stringer packages 206 formed using the bladder mandrel packages 100 in accordance with the various examples provided by the present disclosure. In an example, the fuselage 1218 may include skin panel assemblies manufactured using the compacted stringer packages 206 formed using the bladder mandrel packages 100. In another example, the wings 1220 may include skin panel assemblies manufactured using the compacted stringer packages 206 formed using the bladder mandrel packages 100. In an example, the interior 1206 may include skin panel assemblies manufactured using the compacted stringer packages 206 formed using the bladder mandrel packages 100.

FIG. 25 depicts an exposed view of stiffeners 1230. The stiffeners 1230 are examples of the composite stringers 210 manufactured using the compacted stringer packages 206 formed using the bladder mandrel packages 100. Any other desirable composite component of the aircraft 1200 may be manufactured using the bladder mandrel package 100.

The illustration of the aircraft 1200 is provided for purposes of illustrating one environment in which the different illustrative examples may be implemented. The illustration of the aircraft 1200 in FIG. 25 is not meant to imply architectural limitations as to the manner in which different illustrative examples may be implemented. For example, the aircraft 1200 is shown as a commercial passenger aircraft. The different illustrative examples may be applied to other types of aircraft, such as private passenger aircraft, a rotorcraft, and other suitable type of aircraft.

In one or more examples, the fuselage 1218 and/or wings 1220 of the aircraft 1200 may have a contour. One or more examples of the bladder mandrel package 100 and the compacted stringer package 206 beneficially provide for the composite stringers 210 having contours to match the contour of the fuselage 1218 and/or the wings 1220.

Conventionally, to assemble composite stringers on a cure tool, a number of processes are performed, each of which has an associated performance time. Typically, each stringer component is laid onto the cure tool and then compacted separately. Each process associated with assembling the composite stringers adds to an overall manufacturing time. Manufacturing time may limit a quantity of aircraft produced. Laying the composite material onto a large cure tool is a time limiting step. Laying the composite material is a layered process. One or more of the examples herein provide for forming composite portions offline from the cure tool, which may beneficially reduce manufacturing time. For example, forming multiple composite stringers using the bladder mandrel packages offline from the cure tool may reduce the manufacturing time. Support is desirably provided to hollow portions of composite materials during curing. For example, rigid tooling or pressurized tooling, such as bladders, may be present in hollow portions of the composite materials during curing. Eliminating any of additional curing steps, additional consolidation steps, or additional layup steps will reduce the manufacturing time. One or more of the examples herein provide for consolidating multiple layers of the composite material simultaneously, which may beneficially reduce manufacturing time. One or more of the examples herein also provide for tooling, which serves multiple purposes, and may reduce at least one of the manufacturing time or the manufacturing expense.

As illustrated in FIG. 26, during pre-production, the illustrative method 1100 may include specification and design of aircraft 1200 (Block 1102) and material procurement (Block 1104). During production of the aircraft 1200, component and subassembly manufacturing (Block 1106) and system integration (Block 1108) of the aircraft 1200 may take place. Thereafter, the aircraft 1200 may go through certification and delivery (Block 1110) to be placed in service (Block 1112). The disclosed systems and methods may form a portion of component and subassembly manufacturing (Block 1106) and/or system integration (Block 1108). Routine maintenance and service (Block 1114) may include modification, reconfiguration, refurbishment, etc. of one or more systems of the aircraft 1200.

Each of the processes of the method 1100 illustrated in FIG. 26 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the bladder mandrel package 100, the compacted stringer package 206, the composite structure 200 (e.g., the composite stringer 210), and methods 1000 and 2000 shown and described herein may be employed during any one or more of the stages of the manufacturing and service method 1100 shown in the flow diagram illustrated by FIG. 26. For example, components or subassemblies, such as those that include the composite structure 200 formed using the bladder mandrel packages 100, corresponding to component and subassembly manufacturing (Block 1106) may be fabricated or manufactured in a manner similar to components or subassemblies produced while the aircraft 1200 (FIG. 25) is in service (Block 1112). Also, one or more of the disclosed herein may be utilized during production stages (Blocks 1108 and 1110). Similarly, one or more of the examples disclosed herein may be utilized, for example and without limitation, while the aircraft 1200 is in service (Block 1112) and during maintenance and service stage (Block 1114).

Although an aerospace example is shown, the principles disclosed herein may be applied to other industries, such as the automotive industry, the space industry, the construction industry, and other design and manufacturing industries. Accordingly, in addition to aircraft, the principles disclosed herein may apply to other vehicle structures (e.g., land vehicles, marine vehicles, space vehicles, etc.) and stand-alone structures.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIG. 1, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1, may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 23, 24, and 26, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 23, 24, and 26 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed systems and methods have been shown and described, modifications may occur to those skilled in the art upon reading the specification. The present application includes such modifications and is limited only by the scope of the claims.

What is claimed is:

1. An apparatus for manufacturing a bladder mandrel package, the apparatus comprising:
a die tool to form a partially wrapped mandrel;
sweep arms, movable relative to the die tool, to form a wrapped mandrel;
a radius filler placement mechanism to place a first radius filler and a second radius filler on the wrapped mandrel; and
a consolidating mechanism to form the bladder mandrel package.

2. The apparatus of claim 1, wherein:
the die tool forms a cavity;
the die tool partially wraps a wrap ply around a mandrel when the wrap ply and the mandrel are pressed into the cavity to form the partially wrapped mandrel; and
the sweep arms further wrap the wrap ply around the mandrel to form the wrapped mandrel.

3. The apparatus of claim 2, wherein:
the die tool comprises a die-first portion, comprising a first tooling surface, and a die-second portion, comprising a second tooling surface;
the first tooling surface and the second tooling surface define the cavity;
the first tooling surface sweeps a first intermediate portion of the wrap ply over a second side surface of the mandrel when the wrap ply and the mandrel are pressed into the cavity; and
the second tooling surface sweeps a second intermediate portion of the wrap ply over a first side surface of the mandrel when the wrap ply and the mandrel are pressed into the cavity.

4. The apparatus of claim 3, wherein the die-first portion and the die-second portion are movable relative to each other to enlarge the cavity for receiving the wrap ply and the mandrel.

5. The apparatus of claim 4, wherein:
the die-first portion further comprises number of first interleafing fingers;
the die-second portion further comprises a number of second interleafing fingers; and
the first interleafing fingers and the second interleafing fingers matingly engage with each other during movement of the die-first portion and the die-second portion.

6. The apparatus of claim 4, further comprising a wedge located in the cavity, wherein the wedge supports the wrap ply prior to being pressed into the cavity.

7. The apparatus of claim 6, wherein the wedge drives separation of the die-first portion and the die-second portion when the wrap ply and the mandrel are pressed into the cavity.

8. The apparatus of claim 2, further comprising a pressing tool configured to press the wrap ply and the mandrel into the cavity.

9. The apparatus of claim 2, wherein the sweep arms are configured to sweep a first end portion and a second end portion of the wrap ply over a bottom surface of the mandrel.

10. The apparatus of claim 2, wherein the radius filler placement mechanism is configured to place the first radius filler at a first radius of the wrapped mandrel and to place the second radius filler at a second radius of the wrapped mandrel.

11. The apparatus of claim 2, wherein the consolidating mechanism is configured to consolidate the mandrel, the wrap ply, the first radius filler, and the second radius filler to form the bladder mandrel package.

12. The apparatus of claim 11, wherein the consolidating mechanism comprises:
a vacuum bagging film located between the die tool and the wrapped mandrel, the first radius filler, and the second radius filler; and
a backing plate configured to be sealed to the vacuum bagging film for application of vacuum pressure to the first radius filler, the second radius filler, the wrap ply, and the mandrel.

13. The apparatus of claim 12, wherein the cavity and the backing plate have complementing contours.

14. The apparatus of claim 12, wherein:
an inner mold line ply is placed over the wrapped mandrel, the first radius filler, and the second radius filler; and
the backing plate is configured to be sealed to the vacuum bagging film over the inner mold line ply for application of vacuum pressure to the inner mold line ply, the first radius filler, the second radius filler, the wrap ply, and the mandrel.

15. An apparatus for manufacturing a bladder mandrel package, the apparatus comprising:
a die tool comprising a cavity, wherein the tool die partially wraps a wrap ply around a mandrel when the wrap ply and the mandrel are pressed into the cavity to form a partially wrapped mandrel;
sweep arms, movable relative to the die tool to further wrap the wrap ply around the mandrel to form a wrapped mandrel;
a radius filler placement mechanism to place a first radius filler and a second radius filler on the wrapped mandrel; and
a consolidating mechanism to form the bladder mandrel package.

16. The apparatus of claim 15, further comprising a pressing tool, movable relative to the tool die to press the wrap ply and the mandrel into the cavity.

17. The apparatus of claim 15, wherein the sweep arms sweep a first end portion and a second end portion of the wrap ply over a bottom surface of the mandrel.

18. The apparatus of claim 15, further comprising a wedge located in the cavity, wherein the wedge supports the wrap ply prior to being pressed into the cavity.

19. The apparatus of claim 15, wherein:
the die tool further comprises a die-first portion and a die-second portion;
the die-first portion and the die-second portion form the cavity; and
the die-first portion and the die-second portion are movable relative to each other.

20. The apparatus of claim 19, wherein movement of the die-first portion and the die-second portion relative to each other enlarge the cavity for receiving the wrap ply and the mandrel.

* * * * *